United States Patent
Fujii et al.

(10) Patent No.: US 10,714,022 B2
(45) Date of Patent: Jul. 14, 2020

(54) INFORMATION PROCESSING APPARATUS AND PROGRAM

(71) Applicant: Sony Corporation, Tokyo (JP)

(72) Inventors: Yasutaka Fujii, Tokyo (JP); Kiyohito Fujita, Tokyo (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 14/312,122

(22) Filed: Jun. 23, 2014

(65) Prior Publication Data

US 2014/0300652 A1     Oct. 9, 2014

Related U.S. Application Data

(63) Continuation of application No. 12/534,627, filed on Aug. 3, 2009, now Pat. No. 8,780,033.

(30) Foreign Application Priority Data

Sep. 9, 2008 (JP) .................................. 2008-231273

(51) Int. Cl.
  *G09G 3/34* (2006.01)
  *G02F 1/133* (2006.01)

(52) U.S. Cl.
  CPC ........ *G09G 3/3406* (2013.01); *G02F 1/13318* (2013.01); *G02F 2201/58* (2013.01); *G09G 2320/064* (2013.01); *G09G 2320/0606* (2013.01); *G09G 2360/144* (2013.01)

(58) Field of Classification Search
  CPC ......... G09G 3/3406; G09G 2320/0606; G09G 2320/064; G09G 2360/144; G02F 1/13318; G02F 2201/58

USPC ............. 345/102, 87, 88; 715/700, 864, 866
See application file for complete search history.

(56) References Cited

U.S. PATENT DOCUMENTS

| 5,786,801 | A  |   | 7/1998  | Ichise |
|-----------|----|---|---------|--------|
| 5,894,580 | A  | * | 4/1999  | Yoshida ................. G09G 1/005 713/340 |
| 6,144,359 | A  | * | 11/2000 | Grave .......................... 345/102 |
| 6,157,169 | A  | * | 12/2000 | Lee .................. G01R 19/16542 320/130 |
| 6,192,480 | B1 | * | 2/2001  | Barrus ...................... G06F 1/26 713/320 |
| 6,677,924 | B2 | * | 1/2004  | Nakayama ..................... 345/92 |

(Continued)

FOREIGN PATENT DOCUMENTS

| JP | 4-174819 | 6/1992 |
| JP | 4-352128 | 12/1992 |

(Continued)

OTHER PUBLICATIONS

English Language Machine Translation of JP-2006162253A.*

(Continued)

*Primary Examiner* — Jason M Mandeville
(74) *Attorney, Agent, or Firm* — Xsensus LLP

(57) ABSTRACT

An information processing apparatus is provided that detects brightness and outputs an illuminance value corresponding to the detected brightness, derives a luminance set value for controlling a light emission signal regulating luminance of a light source based on the illuminance value, and displays derived power consumption information related to power consumption of the light source based on the luminance set value.

9 Claims, 14 Drawing Sheets

(56) References Cited

U.S. PATENT DOCUMENTS

| | | | |
|---|---|---|---|
| 6,795,137 | B1 | 9/2004 | Whitted et al. |
| 8,063,871 | B2 | 11/2011 | Lee et al. |
| 8,295,886 | B2 * | 10/2012 | Kwon et al. .......... 455/566 |
| 2002/0049550 | A1 | 4/2002 | Jeong |
| 2004/0070511 | A1 | 4/2004 | Kim |
| 2005/0057484 | A1 * | 3/2005 | Diefenbaugh ....... G09G 3/3406 345/102 |
| 2005/0070339 | A1 | 3/2005 | Kim |
| 2005/0218302 | A1 | 10/2005 | Shin et al. |
| 2005/0240786 | A1 | 10/2005 | Ranganathan |
| 2005/0264482 | A1 | 12/2005 | Suzuki et al. |
| 2006/0006842 | A1 * | 1/2006 | Miskovic ............. G06F 1/3203 320/128 |
| 2006/0022934 | A1 | 2/2006 | Whitted et al. |
| 2007/0236438 | A1 * | 10/2007 | Sung ................... G09G 3/2003 345/88 |
| 2008/0238837 | A1 * | 10/2008 | Yamaguchi ............ G09G 3/20 345/77 |
| 2009/0104941 | A1 * | 4/2009 | Kwon et al. .......... 455/566 |
| 2009/0313484 | A1 | 12/2009 | Millet et al. |
| 2010/0141777 | A1 * | 6/2010 | Jin ..................... G06F 1/3218 348/189 |
| 2010/0194289 | A1 | 8/2010 | Katayanagi et al. |
| 2010/0238293 | A1 | 9/2010 | Baronas et al. |

FOREIGN PATENT DOCUMENTS

| | | | |
|---|---|---|---|
| JP | 7-212666 | | 8/1995 |
| JP | 9-146073 | | 6/1997 |
| JP | 09146073 | A * | 6/1997 |
| JP | 9-230304 | | 9/1997 |
| JP | 2000-208281 | | 7/2000 |
| JP | 2002-323690 | | 11/2002 |
| JP | 2002-354510 | | 12/2002 |
| JP | 2006-162253 | | 6/2006 |
| JP | 2006-174047 | | 6/2006 |
| JP | 2006162253 | A * | 6/2006 |
| JP | 2007-334034 | | 12/2007 |
| JP | 2008-79076 | | 4/2008 |
| JP | 2008-185933 | | 8/2008 |
| JP | 2009-251548 | | 10/2009 |
| WO | WO 0021289 A1 | | 4/2000 |

OTHER PUBLICATIONS

English Language Machine Translation of JP-09146073A.*
English Language Machine Translation of WO-0021289A1.
Machine Translation of JP-2006162253.
Office Action dated Oct. 19, 2010 in JP Application No. 2008-231273.

* cited by examiner

INFORMATION PROCESSING APPARATUS AND PROGRAM

CROSS-REFERENCE TO RELATED APPLICATIONS

This application is a continuation of and is based upon and claims the benefit of priority under 35 U.S.C. § 120 for U.S. Ser. No. 12/534,627, filed Aug. 3, 2009, and claims the benefit of priority under 35 U.S.C. § 119 from Japanese Patent Application No. 2008-231273, filed Sep. 9, 2008. The entire contents of which are incorporated herein by reference.

BACKGROUND OF THE INVENTION

Field of the Invention

The present invention relates to an information processing apparatus and a program.

Description of the Related Art

Various kinds of display apparatus such as an organic EL display (organic ElectroLuminescence display; also called OLED (Organic Light Emitting Diode) display), an FED (Field Emission Display), an LCD (Liquid Crystal Display) and a PDP (Plasma Display Panel) have been developed as alternatives to a CRT display (Cathode Ray Tube display). Among those display apparatus, the liquid crystal display is becoming increasingly widespread a next generation display apparatus as an alternative to a CRT display because of its capability of low power consumption driving and reducing costs due to a maturation of production technology, for example. The liquid crystal display is used as a display device that is included in various kinds of information processing apparatus such as portable communication apparatus like a cellular phone and computers like a notebook PC (Personal Computer), for example. The liquid crystal display is a non-self-luminous display apparatus that includes a liquid crystal panel with a liquid crystal shutter, a light source (e.g. a backlight), a polarizing plate for inputting light emitted from the light source to the liquid crystal panel, and so on, for example.

In such a background, a technique of automatically adjusting luminance in non-self-luminous display apparatus that separately include a light source has been developed. A technique of adjusting the luminous intensity of a light source of a liquid crystal display based on a detection result of a photosensor is disclosed in Japanese Unexamined Patent Publications. Nos. 9-146073 and 4-174819, for example.

SUMMARY OF THE INVENTION

As described above, the liquid crystal display (which is sometimes referred to hereinafter as "LCD"), which is one kind of non-self-luminous display apparatus that separately include a light source, is used as a display device that is included in various kinds of information processing apparatus such as a cellular phone and a notebook PC. The information processing apparatus is not limited to be driven by an external power supply, and it may be driven by a finite internal power supply such as a battery, for example. Thus, some of the above information processing apparatus include a luminance changeover switch or the like, for example, so as to allow a user of the information processing apparatus to adjust the luminance and the power consumption of a light source by manual control of the luminance.

However, because human eyes have logarithmic sensitivity characteristics with respect to outside light, when a user adjusts the luminance using the changeover switch, for example, the brightness which the user actually senses and the power consumption of a light source (e.g. a backlight) at that time do not have a linear relationship. It is thereby difficult for a user to estimate the power consumption of a light source from the brightness of a display device. Consequently, in the information processing apparatus having the luminance changeover switch according to related art, the following cases (a) and (b) can occur:

(a) Despite adjustment of luminance by a user, the amount of reducing the power consumption of a light source is not enough, and a battery runs out during use; and (b) Despite adjustment of luminance by a user, the luminance is set to be excessively low due to being overly conscious of the power consumption of a light source. As a result, the user keeps using the apparatus while a display screen is hard to read.

An information processing apparatus to which the technique according to related art that adjusts the luminous intensity of a light source of an LCD based on a detection result of a photosensor (which is referred to hereinafter simply as "related art") is applied adjusts the luminance based on a detection result of the photosensor. Further, the information processing apparatus according to related art allows luminance adjustment by user's manual control. However, in the information processing apparatus according to related art, no measures are taken about power consumption of the light source. Thus, the information processing apparatus according to related art simply adjusts the luminous intensity of the light source automatically, and a user is unable to keep track of how much power is consumed in the light source. Therefore, the information processing apparatus according to related art does not prevent the occurrence of the above-described cases (a) and (b).

In light of the foregoing, it is desirable to provide a novel and improved information processing apparatus and program that enable adjusting the luminance of a light source based on detected brightness and presenting a user with information about the power consumption of the light source, thereby assisting user's luminance adjustment operation.

According to an embodiment of the present invention, there is provided an information processing apparatus that includes an illuminance detection unit to detect brightness and output an illuminance value corresponding to the detected brightness, a luminance control unit to derive a luminance set value for controlling a light emission signal regulating luminance of a light source based on the illuminance value, and a display control unit to derive power consumption information related to power consumption of the light source based on the luminance set value and display the power consumption information on a display screen.

In this configuration, it is possible to adjust the luminance of the light source based on the detected brightness and present a user with information about the power consumption of the light source, thereby assisting user's luminance adjustment operation.

The information processing apparatus may further include a level setting unit to set one luminance level among a plurality of luminance levels regulating a lower limit and an upper limit of the luminance set value, and the luminance control unit may derive the luminance set value based on the set luminance level and the illuminance value.

If the set luminance level is changed, the luminance control unit may derive a luminance set value corresponding to a luminance level after change from the luminance set value corresponding to the luminance level before change in a step-by-step manner.

The display control unit may derive at least one of power consumption and a power consumption rate as the power consumption information.

The information processing apparatus may further include a light source, and a light source control unit to transfer the light emission signal corresponding to the luminance set value to the light source based on the derived luminance set value.

The illuminance detection unit may give a notification to the luminance control unit when the amount of change in the detected brightness exceeds a predetermined threshold, and the luminance control unit may cause the illuminance detection unit to output the illuminance value based on the notification.

According to another embodiment of the present invention, there is provided a program causing a computer to execute the steps of acquiring an illuminance value from an illuminance detection unit to detect brightness and output an illuminance value corresponding to the detected brightness, deriving a luminance set value for controlling a light emission signal regulating luminance of a light source based on the illuminance value, deriving power consumption information related to power consumption of the light source based on the luminance set value, and displaying the power consumption information on a display screen.

With use of such a program, it is possible to adjust the luminance of the light source based on the detected brightness and present a user with information about the power consumption of the light source, thereby assisting user's luminance adjustment operation.

According to the embodiments of the present invention described above, it is possible to adjust the luminance of a light source based on detected brightness and present a user with information about the power consumption of the light source, thereby assisting user's luminance adjustment operation.

DETAILED DESCRIPTION OF THE PREFERRED EMBODIMENTS

Figure 1:
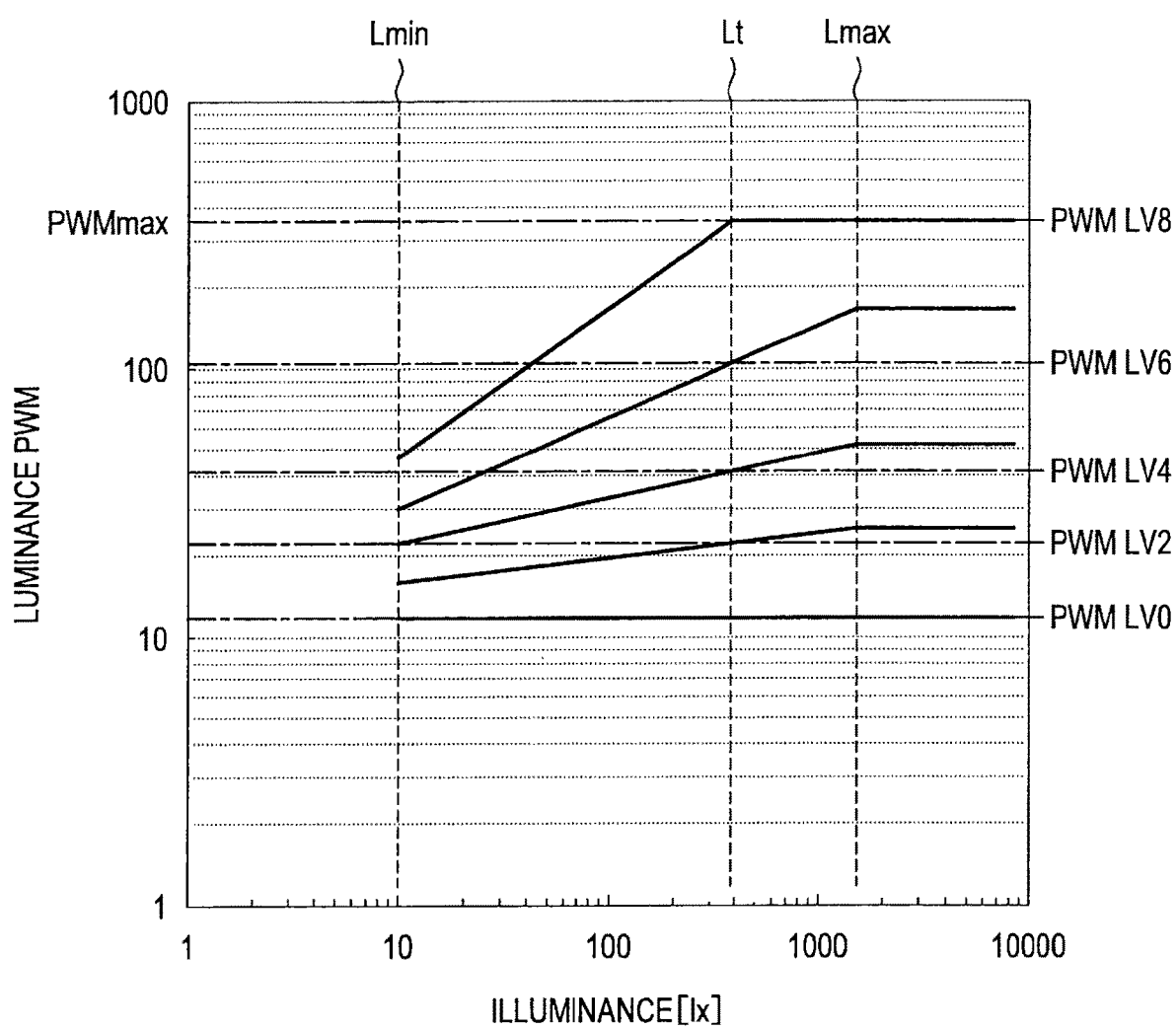
FIG. 1 is an explanatory view to describe an example of a method of deriving a luminance set value in an information processing apparatus according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Although a light source (e.g. a backlight) that constitutes an LCD (Liquid Crystal Display) is described hereinafter as an example of a light source whose luminance is adjusted by an information processing apparatus according to an embodiment of the present invention, the present invention is not limited thereto. For example, an information processing apparatus according to an embodiment of the present invention may adjust the luminance of a light source that constitutes a non-self-luminous display device having a separate light source, such as a DMD (Digital Micromirror Device).

Hereinafter, the description will be given in the following order.

1. Approach according to an embodiment of the present invention.
2. Information processing apparatus according to an embodiment of the present invention.
3. Program according to an embodiment of the present invention.

(Approach According to an Embodiment of the Present Invention)

An information processing apparatus (which is referred to hereinafter as an "information processing apparatus 100") according to an embodiment of the present invention adjusts the luminance of a light source based on detected brightness. Further, the information processing apparatus 100 presents a user with information about the power consumption of the light source, thereby assisting the user to perform luminance adjustment operation. Before describing the configuration of the information processing apparatus 100, an approach for adjustment of the luminance and presentation of information about the power consumption of the light source is described below.

The information processing apparatus 100 adjusts the luminance of a light source based on detected brightness and presents a user with information about the power consumption of the light source by performing "processing of adjusting luminance" and "processing of presenting information about power consumption". The outline of "processing of adjusting luminance" and "processing of presenting information about power consumption" in the information processing apparatus 100 is described hereinafter.

[1] Processing of Adjusting Luminance

The information processing apparatus 100 adjusts the luminance of a light source by two luminance adjustment methods: a first luminance adjustment method based on detected brightness and a second luminance adjustment method based on user's operation (luminance adjustment operation by a user), for example.

The first luminance adjustment method according to an embodiment of the present invention is a method that adjusts the luminance of a light source by deriving a luminance set value for controlling a light emission signal that regulates the luminance of the light source based on an illuminance value according to detected brightness, for example. Thus, the first luminance adjustment method is an automatic luminance adjustment method without need of user's operation, for example. A method of deriving a luminance set value according to an embodiment of the present invention is described later.

The second luminance adjustment method according to an embodiment of the present invention is a method that adjusts the luminance of a light source by performing conditioning to the luminance adjustment by the first luminance adjustment method described above. Specifically, the information processing apparatus 100 performs conditioning to the luminance adjustment by the first luminance adjustment method by setting one luminance level among a plurality of luminance levels that respectively regulate the upper limit and the lower limit of the luminance set value set by the first luminance adjustment method. The information processing apparatus 100 may set the luminance level by providing a changeover switch for switching the luminance level or displaying a switch screen allowing switch setting on a display screen, for example, although not limited thereto. Thus, the second luminance adjustment method is a manual luminance adjustment method based on user's operation, for example. In the following, a case where the information processing apparatus 100 can set nine luminance levels from level 0 to level 8 (the higher the level is, the higher the luminance is, for example) is described by way of illustration. The luminance level according to an embodiment of the present invention is not limited to nine levels as a matter of course.

The information processing apparatus 100 may selectively turn off (disable) a function of the luminance adjustment by the first luminance adjustment method. In such a case, the information processing apparatus 100 adjusts the luminance of a light source to be the luminance that is regulated in advance for each luminance level set by the second luminance adjustment method, for example.

[Method of Deriving a Luminance Set Value]

The information processing apparatus 100 derives the luminance set value by a function of an illuminance value (which is denoted by "lx" in some cases below) and a luminance level (which is denoted by "LV(x)" in some cases below, where x is a natural number) as represented by the following Expression 1, for example. In Expression 1, "PWM(LV(x), lx)" indicates the luminance set value in a case where a certain luminance level is set and a certain illuminance value is detected. Further, in Expression 1, "a(LV(x))" indicates a slope, and "PWM(LV(x), Lmin)" indicates the lower limit of the luminance set value at a certain luminance level. Although Expression 1 is an example in which the luminance set value is represented by a linear function, the method of deriving a luminance set value according to an embodiment of the present invention is not limited thereto. Further, the information processing apparatus 100 sets the lower limit and the upper limit to the luminance set value when deriving the luminance set value at each luminance level in Expression 1. This is for the purpose of preventing a light source from turning out or preventing power consumption of a light source from increasing excessively, for example.

$$PWM(LV(x),lx)=a(LV(x))\times lx+PWM(LV(x),Lmin) \quad \text{Expression 1:}$$

where PWM(LV(x), Lmin)≤PWM(LV(x), lx)≤PWM(LV(x), Lmax)

A method of deriving a luminance set value according to an embodiment of the present invention is hereinafter descried more specifically with reference to FIG. 1. FIG. 1 is an explanatory view to describe an example of a method of deriving a luminance set value in the information processing apparatus 100 according to an embodiment of the present invention. FIG. 1 shows five luminance levels: level 0, 2, 4, 6, 8, among nine luminance levels. The other levels (level 1, 3, 5, 7) can be derived in the same manner and thus not shown in FIG. 1.

In FIG. 1, "PWM LV(x)" is a representative value of PWM at each luminance level, and it corresponds to a value of PWM (which may be set in advance, for example) in the case of not performing the processing [1] (processing of adjusting luminance). Further, in FIG. 1, "Lmin" indicates an illuminance value which corresponds to PWM(LV(x), Lmin), and "Lt" indicates an illuminance value which corresponds to PWM LV(x). In FIG. 1, "Lmax" indicates an illuminance value which corresponds to the upper limit of the luminance set value at each luminance level. FIG. 1 shows an example in which "PWMmax" is set as the upper limit of the luminance set value at an arbitrary luminance level. Because PWMmax is set, even if a detected illuminance value is equal to or lower than Lmax, the information processing apparatus 100 outputs PWMmax as the luminance set value when the luminance set value corresponding to the illuminance value exceeds PWMmax. Although PWMmax may be set to a maximum gradation value (e.g. 255 gradation), for example, it is not limited thereto. For example, PWMmax may be set to an arbitrary value that is smaller than the maximum gradation in order to suppress the power consumption of a light source.

As shown in FIG. 1, the information processing apparatus 100 derives the luminance set value at each luminance level according to an illuminance value based on the line shown in Expression 1, the lower limit at each luminance level and the upper limit at each luminance level, for example.

[i] Derivation of a Lower Limit ((PWM(LV(x), Lmin) in Expression 1)

The information processing apparatus 100 derives the lower limit at each luminance level by using the following Expression 2, for example. In Expression 2, "Min PWM Rate" indicates a rate of the luminance value at Lmin in the luminance value at Lt.

$$PWM(LV(x),Lmin)=(PWM\,LV(x)-PWM\,LV0)\times(Min\,PWM\,Rate)+PWM\,LV0 \quad \text{Expression 2:}$$

[ii] Derivation of a slope (a(LV(x))) in Expression 1

The information processing apparatus 100 derives the slope at each luminance level by using the following Expression 3, for example, based on the lower limit at each luminance level and the luminance set value at Lt, which is PWM LV(x).

$$a(LV(x))=(PWM\,LV(x)-PWM(LV(x),Lmin))/(Lt-Lmin) \quad \text{Expression 3:}$$

The information processing apparatus 100 can derive the luminance set value at an arbitrary luminance level and at an arbitrary illuminance value by using the above Expressions 1 to 3, the lower limit at each luminance level and the upper limit at each luminance level, for example.

The information processing apparatus 100 may derive the luminance set value by performing calculation of the above Expressions 1 to 3, comparison of a calculation result with the upper limit and the lower limit or the like each time an illuminance value corresponding to detected brightness is transferred from an illuminance sensor, for example, although not limited thereto. Alternatively, the information processing apparatus 100 may store a look-up table that represents values on a line chart at each luminance level as shown in FIG. 1 and contains luminance values and luminance set values associated in one-to-one correspondence, for example. With use of such a look-up table, the information processing apparatus 100 can uniquely derive the luminance set value based on the illuminance value.

Further, when a luminance level is changed by user operation or the like, the information processing apparatus 100 can derive the luminance set value in the same manner as above based on the latest illuminance value and the changed luminance level. A method of deriving a luminance set value in the case where a luminance level is changed is not limited thereto. For example, the information processing apparatus 100 may store a parameter for change in luminance level and derive the luminance set value according to a change in luminance level based on the changed luminance level and the parameter.

[2] Processing of Presenting Information about Power Consumption (Power Consumption Information)

Further, the information processing apparatus 100 presents a user with information about power consumption of a light source whose luminance is adjusted. The information about power consumption is information for notifying a user of power consumed in a light source. The information about power consumption may be a value of power consumption of a light source, a rate in the maximum power consumption of a light source (power consumption rate) or the like, though not limited thereto. A method of presenting information about power consumption in the information processing apparatus 100 may be displaying information about power consumption on a display screen (visual presentation), for example, although not limited thereto. Alternatively, the information processing apparatus 100 may transfer information about power consumption to a user by sound (auditory presentation). In the following, the case where the information processing apparatus 100 displays information about power consumption on a display screen is described by way of illustration.

[Significance of Presenting a User with Information about Power Consumption]

Figure 2:
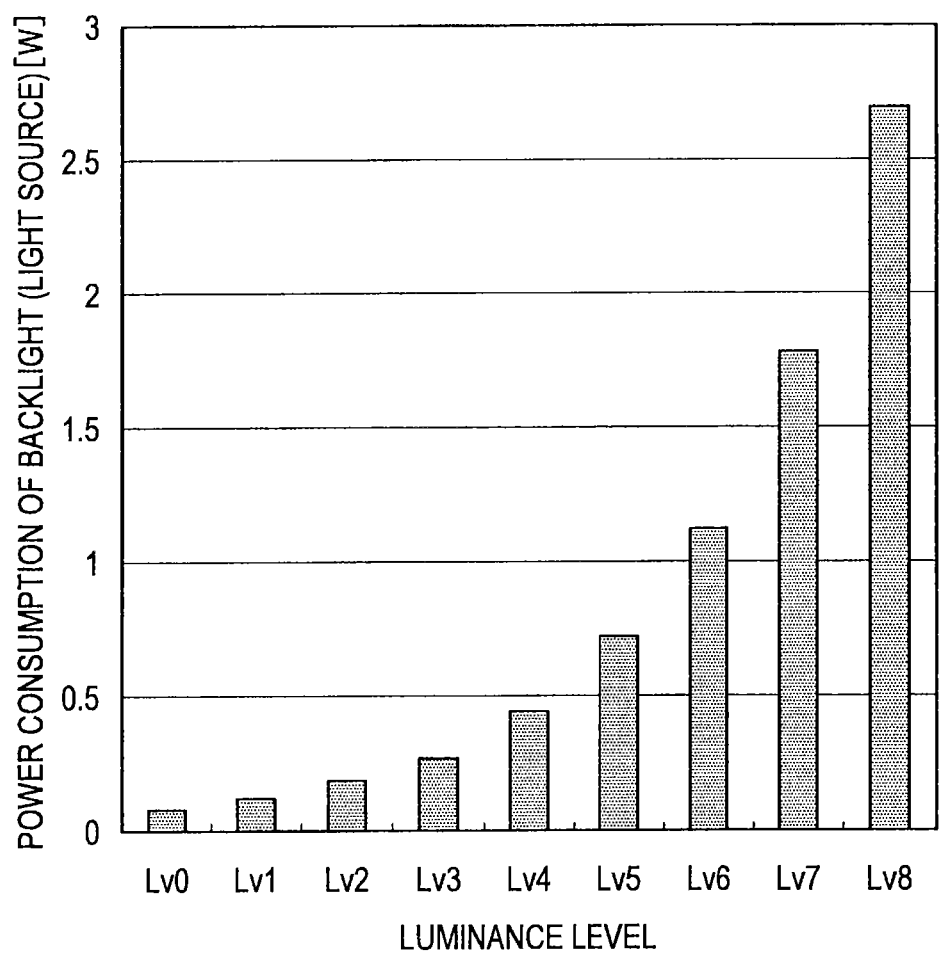
FIG. 2 is an explanatory view to describe significance of presenting information about power consumption of a light source in an information processing apparatus according to an embodiment of the present invention.

The significance that the information processing apparatus 100 presents a user with information about power consumption is described hereinafter. FIG. 2 is an explanatory view to describe the significance that the information processing apparatus 100 according to an embodiment of the present invention presents information about power consumption of a light source. FIG. 2 shows nine luminance levels that can be perceived by human eyes as uniform changes and an example of power consumption of a backlight (light source) at each level. In the following description, a light source is sometimes called a backlight. A light source according to an embodiment of the present invention is not limited to a backlight as a matter of course. Although FIG. 2 shows an example in which a luminance level is represented by nine levels, a luminance level is not limited to nine levels.

As shown in FIG. 2, the brightness which a user actually senses (which corresponds to a luminance level) and the power consumption of a backlight at that time do not have a linear relationship. This is because human eyes have logarithmic sensitivity characteristics with respect to outside light. Accordingly, when a user adjusts a luminance level based on the brightness of a display screen (e.g. by using the changeover switch or the like), it is difficult for a user to recognize the power consumption of the backlight from the brightness perceived by the eyes. In view of this, the information processing apparatus 100 presents a user with information about the power consumption of a light source in order to prevent or suppress the occurrence of the above-described cases (a) and (b), for example. Given the information about the power consumption of a light source, a user can recognize how much power is consumed in the light source, and it is thereby possible to set the luminance level more easily according to a purpose.

The information processing apparatus 100 presents information about power consumption of a light source as described above, thereby assisting a user to set a luminance level (the second luminance adjustment method; luminance adjustment operation by a user).

[Method of Deriving Information about Power Consumption]

A method of deriving information about power consumption in the information processing apparatus 100 is described hereinafter.

Figure 3:
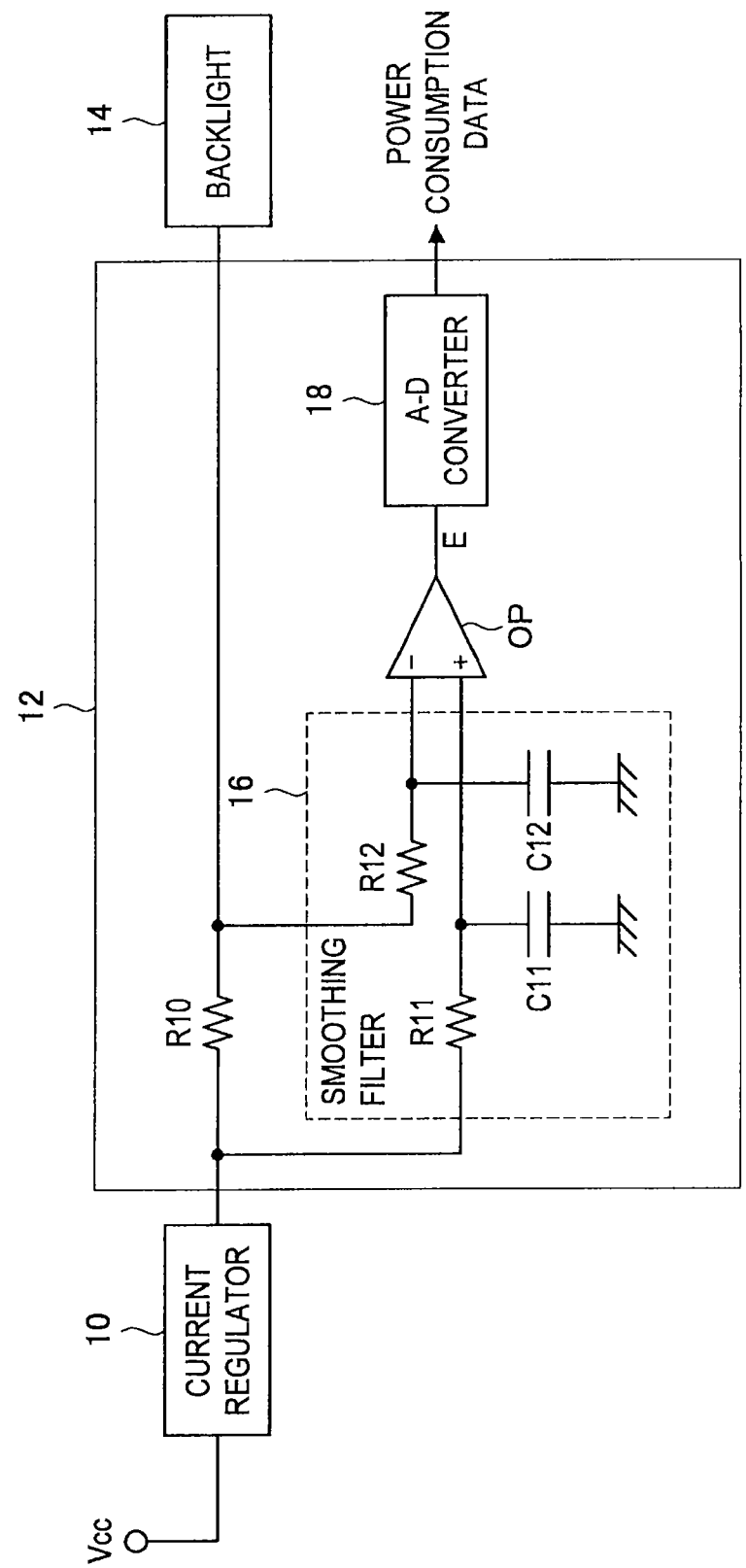
FIG. 3 is an explanatory view showing an example of a means of deriving information about power consumption of a light source.

FIG. 3 is an explanatory view showing an example of a means of deriving information about power consumption of a light source. FIG. 3 shows an example in which a dedicated circuit for deriving information about power consumption (which is referred to hereinafter as "derivation circuit 12") is placed between a current regulator 10 and a backlight 14, and information about power consumption is derived using the derivation circuit 12.

The current regulator 10 outputs a driving voltage based on a power supply voltage Vcc and thereby controls a driving current flowing into the backlight 14. The backlight 14 (light source) emits light with luminance according to the driving current based on the driving voltage transferred from the current regulator 10. The derivation circuit 12 outputs information about power consumption of the backlight 14 based on the driving voltage output from the current regulator 10.

The derivation circuit 12 includes a current detection resistor R10, a smoothing filter 16 composed of a low-pass filter, a differential amplifier OP and an A-D converter (Analog-to-Digital converter) 18, for example. The principle of operation of the derivation circuit 12 shown in FIG. 3 is to measure a current flowing through the current detection resistor R10 and derive information about power consumption based on a measured value. Specifically, the derivation circuit 12 shown in FIG. 3 derives power consumption by using the following Expression 4 and outputs power consumption as a digital signal (power consumption data). In Expression 4, "E" indicates a voltage that is input to the A-D converter 18, and "R" indicates a resistance value of the current detection resistor R10. Further, in Expression 4, "A" indicates a gain of the differential amplifier OP, and "Vcc" indicates a power supply voltage.

$$\text{Power consumption} = E/(R \times A) \times Vcc \quad \text{Expression 4:}$$

The information processing apparatus 100 can acquire information about power consumption of a light source. by including a dedicated circuit for deriving information about power consumption as shown in FIG. 3. However, the inclusion of a dedicated circuit as shown in FIG. 3 causes an increase in costs of the information processing apparatus 100. In light of this, in order to prevent an increase in costs related to derivation of information about power consumption, the information processing apparatus 100 according to an embodiment of the present invention derives information about power consumption by another method without including a dedicated circuit for deriving information about power consumption as shown in FIG. 3.

Specifically, the information processing apparatus 100 derives information about power consumption by the following deriving methods (I) to (III), for example, based on the luminance set value that is derived by the above processing [1]. In the following, the case where the information processing apparatus 100 derives a value of power consumption and a power consumption rate as information about power consumption is described by way of illustration. A method of deriving information about power consumption according to an embodiment of the present invention is not limited to the following deriving methods (I) to (III).

(I) First Method of Deriving Information about Power Consumption

The information processing apparatus 100 derives a value of power consumption and a power consumption rate by using the following Expression 5 and Expression 6, respectively, for example.

$$\text{Power consumption rate [\%]} = (\text{Luminance set value}/\text{Maximum luminance value}) \times 100 \quad \text{Expression 5:}$$

$$\text{Value of power consumption } [W] = \text{Power at maximum luminance} \times \text{Power consumption rate} \quad \text{Expression 6:}$$

(II) Second Method of Deriving Information about Power Consumption

The information processing apparatus 100 stores a look-up table in which a luminance set value and a value of power consumption (an example of information about power consumption) are associated in one-to-one correspondence, for example. The information processing apparatus 100 uniquely derives a value of power consumption based on the luminance set value and the look-up table. Then, the information processing apparatus 100 derives a power consumption rate by using the derived value of power consumption and the following Expression 7.

$$\text{Power consumption rate [\%]} = (\text{Power consumption}/\text{Power at maximum luminance}) \times 100 \quad \text{Expression 7:}$$

(III) Third Method of Deriving Information about Power Consumption

The information processing apparatus 100 uniquely derives power consumption based on a relational expression representing a relationship between a luminance set value and a value of power consumption (e.g. the following Expression 8), for example. Then, the information processing apparatus 100 derives a power consumption rate by using the derived value of power consumption and the above Expression 7. The relational expression representing a relationship between a luminance set value and a value of power consumption is not limited to the following Expression 8, and it may vary depending on the kind and the number of light sources or the like. Thus, the information processing apparatus 100 can uniquely derive power consumption by an arbitrary relational expression representing a relationship between a luminance set value and a value of power consumption.

$$\text{Power consumption } [W] = a \times (\text{Luminance set value}) + b \quad \text{Expression 8:}$$

The information processing apparatus 100 can derive information about power consumption by using the above deriving methods (I) to (III), for example, based on the luminance set value that is derived by the above processing [1]. Therefore, it is not necessary for the information processing apparatus 100 to include a dedicated circuit for deriving information about power consumption as shown in FIG. 3, thereby preventing an increase in costs of the information processing apparatus 100. The information processing apparatus 100 may, of course, include a dedicated circuit for deriving information about power consumption as shown in FIG. 3.

The information processing apparatus 100 can present information about power consumption of a light source by deriving information about power consumption based on the luminance set value, for example. Thus, the information processing apparatus 100 can assist user's luminance adjustment operation (e.g. operation for the second luminance adjustment method) by presenting a user with information about power consumption of a light source.

The information processing apparatus 100 performs the above processing [1] (processing of adjusting luminance) and the above processing [2] (processing of presenting information about power consumption), for example. Therefore, the information processing apparatus 100 can adjust the luminance of a light source based on detected brightness and present a user with information about the power consumption of the light source, thereby assisting user's luminance adjustment operation.

(Information Processing Apparatus 100 According to an Embodiment of the Present Invention)

Figure 4:
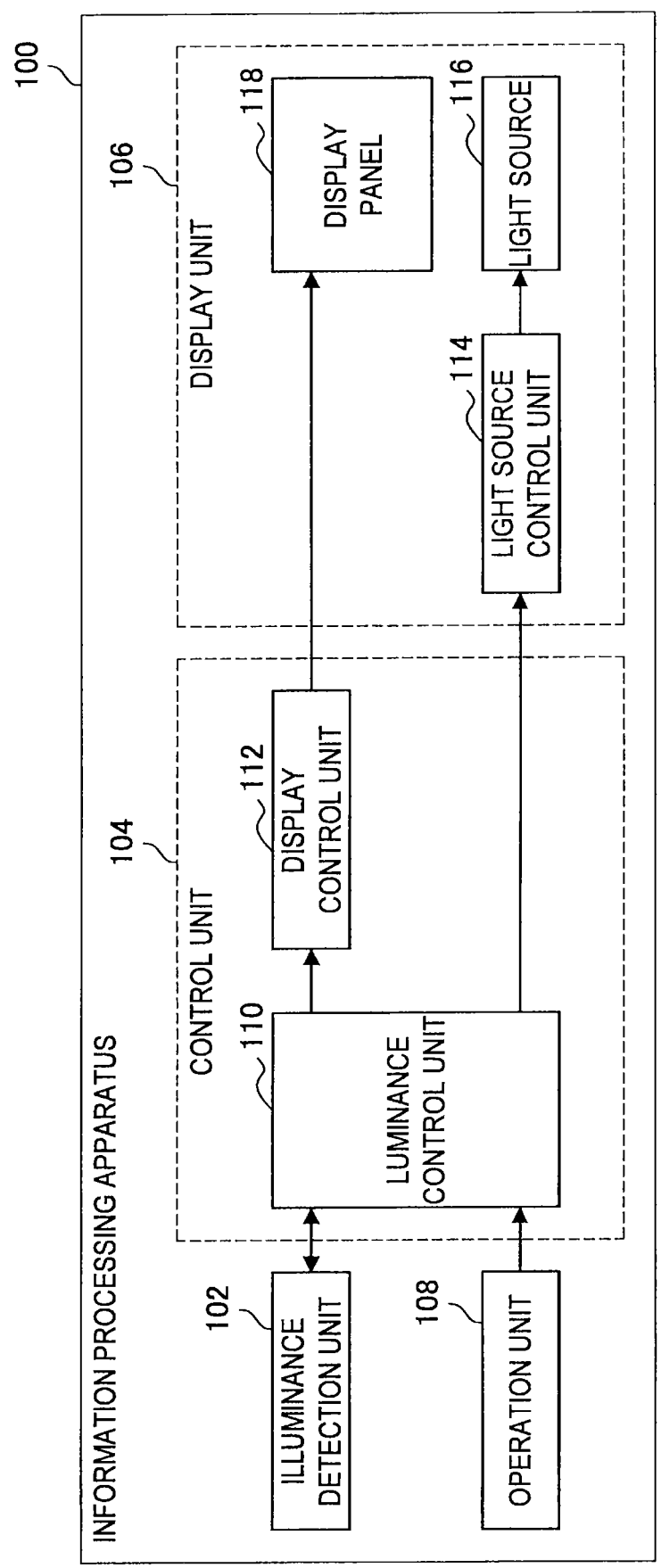
FIG. 4 is a block diagram showing an example of a configuration of an information processing apparatus according to an embodiment of the present invention.

Hereinafter, a configuration of the information processing apparatus 100 according to an embodiment of the present invention that achieves the above-described approach according to an embodiment of the present invention is described. FIG. 4 is a block diagram showing an example of a configuration of the information processing apparatus 100 according to an embodiment of the present invention. Although FIG. 4 shows a configuration in which the information processing apparatus 100 includes a light source 116, a display panel 118 forming a display screen on which various kinds of information such as information about power consumption is displayed or the like, the present invention is not limited thereto. For example, the information processing apparatus 100 may control the luminance of a light source included in a non-self-luminous display device as an external apparatus and display information about power consumption on a display screen of the display device, rather than including the light source 116, the display panel 118 or the like.

Referring to FIG. 4, the information processing apparatus 100 includes an illuminance detection unit 102, a control unit 104, a display unit 106 and an operation unit 108. The information processing apparatus 100 may further include an internal power supply (not shown) that supplies a power supply voltage for driving the respective elements or the like.

Further, the information processing apparatus 100 may include ROM (Read Only Memory; not shown), RAM (Random Access Memory; not shown), a communication unit (not shown), a storage unit (not shown) or the like. In the information processing apparatus 100, the respective elements may be connected through a bus, which is a data transmission line, for example.

The ROM stores programs to be used by the control unit 104 and control data such as calculation parameters. The RAM primarily stores programs to be executed by the control unit 104 or the like. The communication unit (not shown) has a function of performing wired/wireless communication with an external apparatus via a network (or directly). The network may be a wired network such as LAN (Local Area Network) or WAN (Wide Area Network), a wireless network via a base station such as a wireless WAN (WWAN; Wireless Wide Area Network) or a wireless MAN (WMAN; Wireless Metropolitan Area Network), Internet using a communication protocol such as TCP/IP (Transmission Control Protocol/Internet Protocol) or the like, for example, although not limited thereto. Further, the communication unit (not shown) may be a communication antenna and an RF circuit (wireless communication), an IEEE 802.15.1 port and a transmitting and receiving circuit (wireless communication), an IEEE 802.11b port and a transmitting and receiving circuit (wireless communication), a LAN terminal and a transmitting and receiving circuit (wired communication) or the like, for example, although not limited thereto.

The storage unit (not shown) is an information storage means that is included in the information processing apparatus 100. With the storage unit included, the information processing apparatus 100 can store various data (information) such as OS (Operating System; basic software) and application (application software). The storage unit (not shown) may be a magnetic recording medium such as hard disk, nonvolatile memory such as EEPROM (Electrically Erasable and Programmable Read Only Memory), flash memory, MRAM (Magnetoresistive Random Access Memory), FeRAM (Ferroelectric Random Access Memory) or PRAM (Phase-change Random Access Memory) or the like, though not limited thereto.

[Exemplary Hardware Configuration of the Information Processing Apparatus 100]

Figure 5:
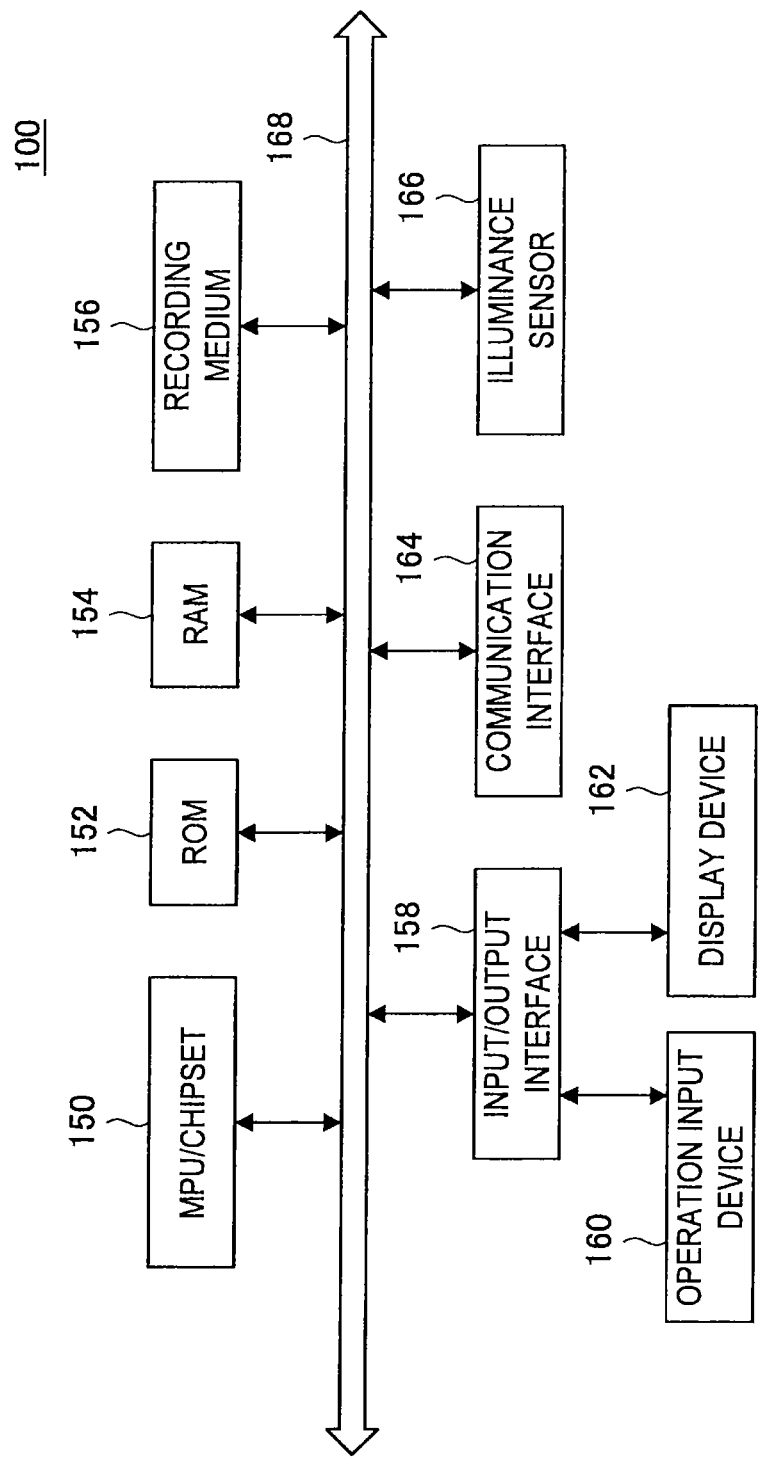
FIG. 5 is an explanatory view showing an example of a hardware configuration of an information processing apparatus according to an embodiment of the present invention.

FIG. 5 is an explanatory view showing an example of a hardware configuration of the information processing apparatus 100 according to an embodiment of the present invention. Referring to FIG. 5, the information processing apparatus 100 includes an MPU/chipset 150, ROM 152, RAM 154, a recording medium 156, an input/output interface 158, an operation input device 160, a display device 162, a communication interface 164 and an illuminance sensor 166, for example. In the information processing apparatus 100, the respective elements are connected through a bus 168, which is a data transmission line, for example.

The MPU/chipset 150 is composed of an MPU (Micro Processing Unit), a chipset where a plurality of circuits are integrated for implementing a control function or the like, and functions as the control unit 104 that controls the information processing apparatus 100 as a whole. The MPU/chipset 150 may also have a role as a luminance control unit 110 and a display control unit 112, which are described later, in the information processing apparatus 100.

The ROM 152 stores programs to be used by the MPU and control data such as calculation parameters. The RAM 154 primarily stores programs to be executed by the MPU or the like.

The recording medium 156 functions as the above-described storage unit (not shown) and stores an application, a look-up table and so on, for example. The recording medium 156 may be a magnetic recording medium such as hard disk, nonvolatile memory such as flash memory or the like, for example, although not limited thereto.

The input/output interface 158 connects the operation input device 160, the display device 162 or the like, for example. The operation input device 160 functions as the operation unit 108, and the display device 162 functions as the display unit 106. The input/output interface 158 may be an USB (Universal Serial Bus) terminal, a DVI (Digital Visual Interface) terminal, an HDMI (High-Definition Multimedia Interface) terminal or the like, although not limited thereto. Further, the operation input device 160 may be placed on the information processing apparatus 100 and connected to the input/output interface 158 inside the information processing apparatus 100, for example. The operation input device 160 may be a rotating selector such as a button, a direction key or a jog dial, a combination of those or the like, for example, though not limited thereto. Further, the display device 162 may be placed on the information processing apparatus 100 and connected to the input/output interface 158 inside the information processing apparatus 100, for example. The display device 162 may be a non-self-luminous display device such as an LCD (Liquid Crystal Display), though not limited thereto. Alternatively, the input/output interface 158 may be connected to an operation input device (e.g. a keyboard or a mouse), a display device (e.g. an external display) as an external apparatus of the information processing apparatus 100.

The communication interface 164 is a communication means that is included in the information processing apparatus 100 and functions as a communication unit (not shown) that performs wired/wireless communication with an external apparatus via a network (or directly). The communication interface 164 may be a communication antenna and an RF circuit (wireless communication), an IEEE 802.15.1 port and a transmitting and receiving circuit (wireless communication), an IEEE 802.11b port and a transmitting and receiving circuit (wireless communication), a LAN terminal and a transmitting and receiving circuit (wired communication) or the like, for example, although not limited thereto. The communication interface 164 may have a structure compatible with a network, for example.

The illuminance sensor 166 detects brightness in the vicinity of the information processing apparatus 100 and selectively outputs an illuminance value according to the detected brightness. A prescribed threshold is set to the illuminance sensor 166, and when the amount of change in the detected brightness exceeds the threshold, the illuminance sensor 166 gives a notification to the MPU (or an application executed by the MPU; which is the same below), for example. Receiving the notification, the MPU acquires an illuminance value from the illuminance sensor 166. The illuminance sensor 166 can thereby selectively output an illuminance value. Alternatively, the illuminance sensor 166 may output an illuminance value according to the detected brightness periodically or non-periodically.

Communication between the illuminance sensor 166 and the MPU may be made through BIOS (Basic Input/Output System; basic software) that is executed by the MPU, for example, although not limited thereto.

By the hardware configuration as shown in FIG. 5, for example, the information processing apparatus 100 performs the above processing [1] (processing of adjusting luminance) and the above processing [2] (processing of presenting information about power consumption). The hardware configuration of the information processing apparatus 100 is not limited thereto, and a battery (internal power supply) that supplies a driving power supply to the respective elements or the like may be further included. The information processing apparatus 100 may have a configuration that does not include the display device 162, for example.

Referring again to FIG. 4, the configuration of the information processing apparatus 100 is described hereinafter. The illuminance detection unit 102 is configured by the illuminance sensor 166, for example, and detects the brightness in the vicinity of the information processing apparatus 100. Further, the illuminance detection unit 102 selectively outputs an illuminance value (or a parameter representing an illuminance value) according to the detected brightness to the control unit 104 in response to an acquisition request that is transferred from the control unit 104 (specifically, the luminance control unit 110, which is described later).

[Example of Processing of the Illuminance Detection Unit 102]

Figure 6:
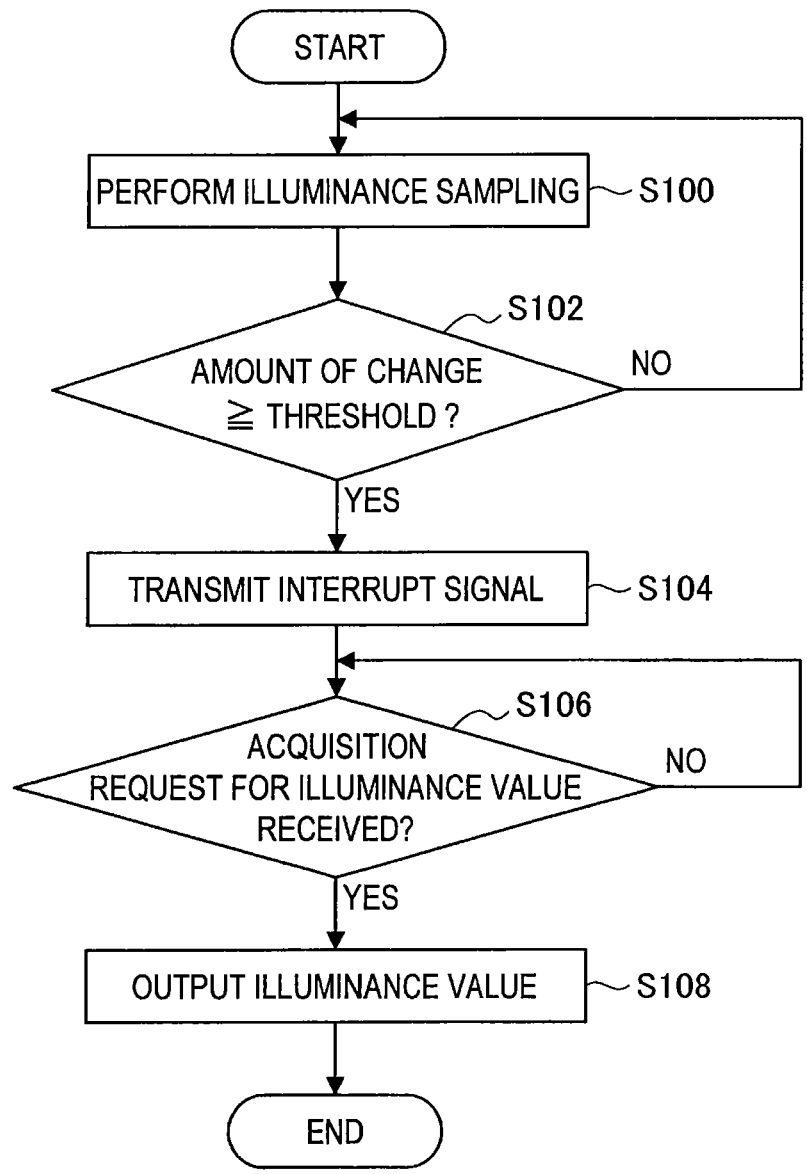
FIG. 6 is a flowchart showing an example of processing of an illuminance detection unit included in an information processing apparatus according to an embodiment of the present invention.

FIG. 6 is a flowchart showing an example of processing of the illuminance detection unit 102 that is included in the information processing apparatus 100 according to an embodiment of the present invention.

The illuminance detection unit 102 detects brightness and performs illuminance sampling (S100). Next, the illuminance detection unit 102 determines whether the amount of change in illuminance value becomes equal to or larger than (or becomes larger than) a set threshold as a result of the illuminance sampling in the step S100 (S102). The threshold that is set to the illuminance detection unit 102 is set by the control unit 104 (specifically, the luminance control unit 110, which is described later), for example. An example of the threshold that is set to the illuminance detection unit 102 is described later with reference to FIG. 8.

If it is not determined in the step S102 that the amount of change in illuminance value becomes equal to or larger than the set threshold, the illuminance detection unit 102 repeats processing from the step S100.

On the other hand, if it is determined in the step S102 that the amount of change in illuminance value becomes equal to or larger than the set threshold, the illuminance detection unit 102 transmits an interrupt signal to the control unit 104 (specifically, the luminance control unit 110, which is described later) (S104). Communication between the illuminance detection unit 102 and the control unit 104 is performed through BIOS, for example, though not limited thereto. The interrupt signal that is transmitted from the illuminance detection unit 102 corresponds to a notification from the illuminance detection unit 102 to the control unit 104.

After transmitting the interrupt signal in the step S104, the illuminance detection unit 102 determines whether an acquisition request for an illuminance value is received (S106). The acquisition request for an illuminance value is transmitted from the control unit 104 (specifically, the luminance control unit 110, which is described later) in response to reception of the interrupt signal, for example. Further, although the illuminance detection unit 102 may perform the determination of the step S106 based on the received acquisition request for an illuminance value, for example, the present invention is not limited thereto. For example, the illuminance detection unit 102 may determine whether the acquisition request for an illuminance value is received according to a change in signal level of a signal transferred to a particular signal line.

If it is not determined in the step S106 that the acquisition request for an illuminance value is received, the illuminance detection unit 102 does not proceed to the next step until it is determined that the acquisition request for an illuminance value is received. If the acquisition request for an illuminance value is not received after a lapse of a prescribed time period from the transmission of the interrupt signal in the step 104, the illuminance detection unit 102 may perform the processing of the step S104 again, for example.

On the other hand, if it is determined in the step S106 that the acquisition request for an illuminance value is received, the illuminance detection unit 102 outputs an illuminance value (S108). The illuminance value that is output in the step S108 is transferred to the control unit 104 (specifically, the luminance control unit 110, which is described later), through BIOS, for example.

The illuminance detection unit 102 can selectively output an illuminance value by the processing as shown in FIG. 6, for example. In the case where the illuminance detection unit 102 performs the processing shown in FIG. 6, the illuminance detection unit 102 performs the threshold determination processing in the step S102, and it is therefore not necessary to perform the threshold determination processing in the control unit 104 that includes the MPU or the like, for example, in the information processing apparatus 100. Generally, power consumption of an illuminance sensor necessary for processing is lower than power consumption of an MPU necessary for processing. Thus, by including the illuminance detection unit 102 that performs the processing as shown in FIG. 6, the information processing apparatus 100 can reduce the power consumption that is necessary for the processing [1] (processing of adjusting luminance).

The processing in the illuminance detection unit 102 according to an embodiment of the present invention is not limited to the processing shown in FIG. 6. For example, the illuminance detection unit 102 may transfer a result of the illuminance sampling in the step S100 to the control unit 104 each time sampling is performed or non-periodically. Further, although not shown in FIG. 6, the illuminance detection unit 102 may enter an interrupt state that suspends the illuminance sampling processing in the step S100 after outputting the interrupt signal in the step S104. The interrupt state in the illuminance detection unit 102 is released by an interrupt release instruction that is transferred from the luminance control unit 110, for example. As a result that the illuminance detection unit 102 enters the interrupt state as described above, it is possible to prevent an interrupt signal from being transferred during the processing of deriving the luminance set value in the luminance control unit 110, for example. The information processing apparatus 100 can thereby adjust the luminance of a light source with more stability, for example.

Referring again to FIG. 4, the configuration of the information processing apparatus 100 is described. The control unit 104 is composed of an MPU, a chipset or the like, for example, and has a function of controlling the information processing apparatus 100 as a whole. Further, the control unit 104 includes the luminance control unit 110 and the display control unit 112, and has a role to perform the above processing [1] (processing of adjusting luminance) and the above processing [2] (processing of presenting information about power consumption).

The luminance control unit 110 derives the luminance set value based on an illuminance value that is output from the illuminance detection unit 102 or a switch signal according to operation input or the like in the operation unit 108, which is described later, for example. The switch signal is a signal that triggers processing of changing a luminance level and indicates a luminance level after change, for example.

[Processing 1 of the Luminance Control Unit 110: Processing of Deriving a Luminance Set Value Based on an Illuminance Value]

Figure 7:
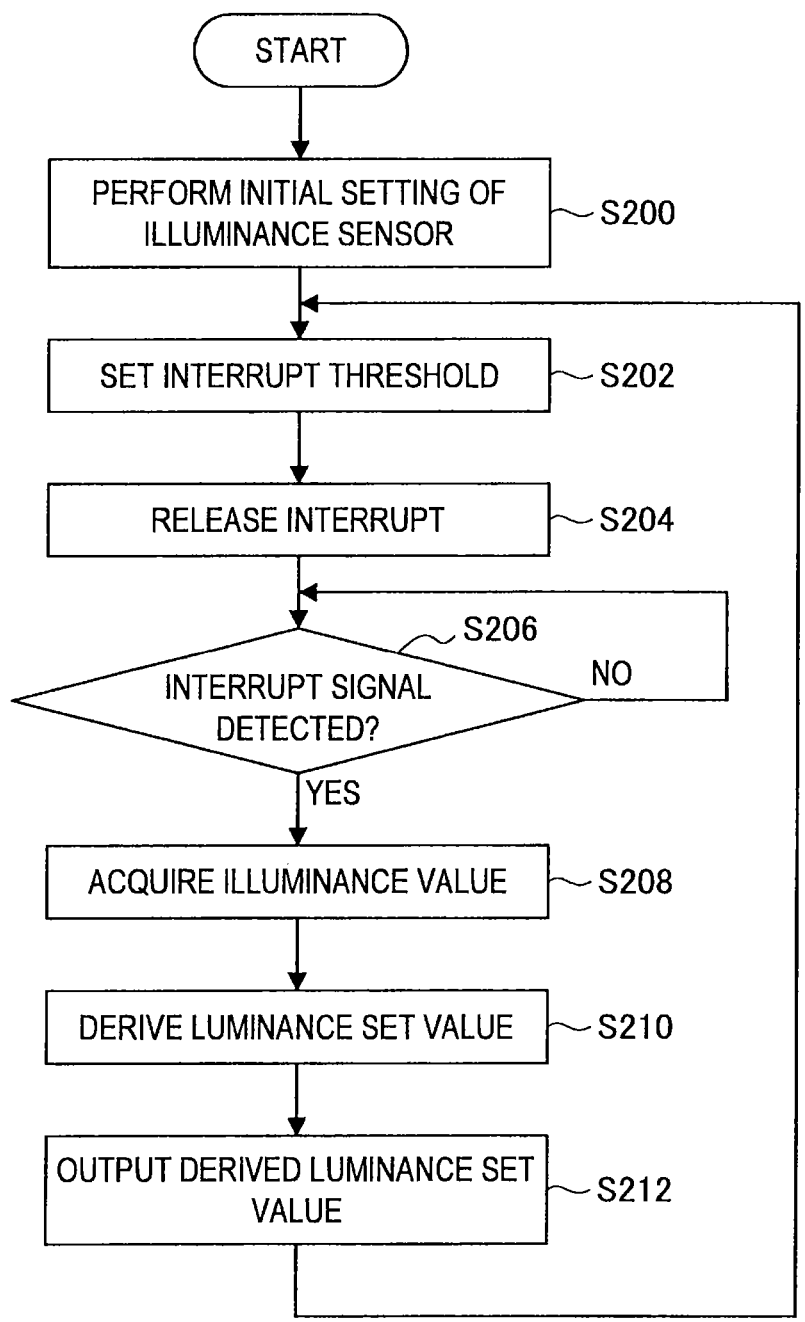
FIG. 7 is a flowchart showing a first example of processing of a luminance control unit in an information processing apparatus according to an embodiment of the present invention.

FIG. 7 is a flowchart showing a first example of processing of the luminance control unit 110 in the information processing apparatus 100 according to an embodiment of the present invention. FIG. 7 shows an example of processing of deriving a luminance set value based on an illuminance value in the information processing apparatus 100.

The luminance control unit 110 performs initial setting of an illuminance sensor that forms the illuminance detection unit 102 (S200). Then, the luminance control unit 110 sets a threshold for transmitting an interrupt signal to the illuminance sensor (S202).

<Method of Setting an Interrupt Threshold>

Figure 8:
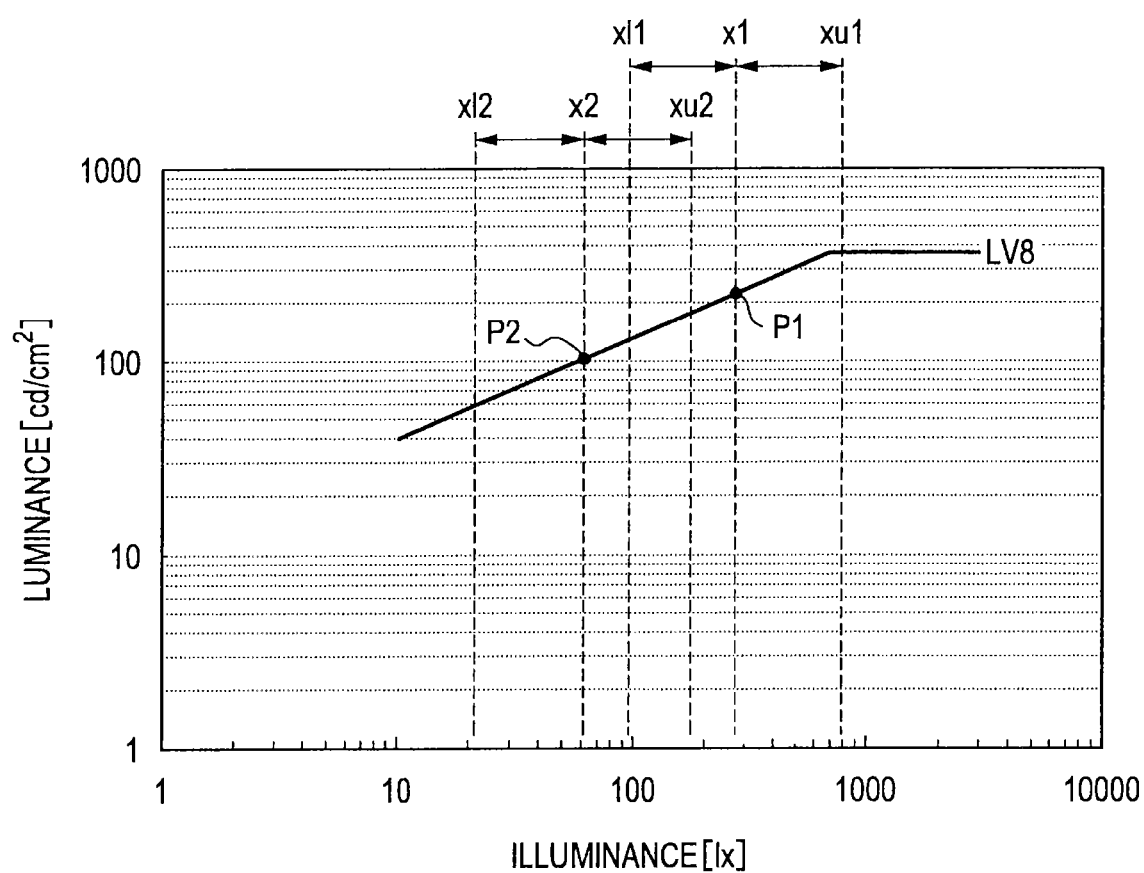
FIG. 8 is an explanatory view to describe an example of a method of setting an interrupt threshold in an information processing apparatus according to an embodiment of the present invention.

FIG. 8 is an explanatory view to describe an example of a method of setting an interrupt threshold in the information processing apparatus 100 according to an embodiment of the present invention. FIG. 8 shows an example in which a luminance level is 8. In FIG. 8, P1 indicates the current illuminance and luminance, and P2 indicates the illuminance and luminance after change. A method of setting an interrupt threshold is described hereinafter, taking before and after updating the luminance as an example.

The luminance control unit 110 sets a lower-illuminance threshold Xl1 and a higher-illuminance threshold Xu1 with respect to the current illuminance x1 as the interrupt threshold. The luminance control unit 110 sets two thresholds of a lower-illuminance threshold and a higher-illuminance threshold because the detected brightness can change to be both darker and brighter depending on a change in the peripheral environment of the information processing apparatus 100. Thus, the interrupt threshold that is set by the luminance control unit 110 is a threshold for determining the amount of change in illuminance value.

The luminance control unit 110 sets a lower-illuminance change amount [%] and a higher-illuminance change amount [%] as thresholds in advance, calculates a lower-illuminance threshold and a higher-illuminance threshold by using the following Expression 9 and Expression 10, respectively, and causes the illuminance detection unit 102 to set the lower-illuminance threshold and the higher-illuminance threshold, for example. A method of setting a lower-illuminance threshold and a higher-illuminance threshold in the information processing apparatus 100 is not limited to the above method. Further, although it is typical that the illuminance detection unit 102 includes a plurality of sensors with different wavelength sensitivity and an illuminance value is calculated from measured values of those sensors, there is a case where a value of only one sensor element can be used for threshold determination. In such a case, an interrupt threshold may be set to a value of the sensor having wavelength sensitivity that is the closest to human sensitivity characteristics.

Lower-illuminance threshold after change=Illuminance value after change×(Lower-illuminance change amount [%]/100)   Expression 9:

Higher-illuminance threshold after change=Illuminance value after change× (Higher-illuminance change amount [%]/100)   Expression 10:

If an illuminance value that is detected by the illuminance detection unit 102 is larger than (or equal to or larger than) either one of the lower-illuminance threshold Xl1 or the higher-illuminance threshold Xu1, the illuminance detection unit 102 transfers the interrupt signal to the luminance control unit 110. Upon receiving the interrupt signal, the luminance control unit 110 acquires an illuminance value from the illuminance detection unit 102 and derives a luminance set value by the method of deriving a luminance set value described above. As a result that the luminance control unit 110 derives the luminance set value, the current illuminance and luminance change from P1 to P2. Then, the luminance control unit 110 transfers a new lower-illuminance threshold Xl2 to the illuminance detection unit 102, so that a higher-illuminance threshold Xu2 is set as the interrupt threshold.

The information processing apparatus 100 can set the interrupt threshold corresponding to the derived luminance set value by the above-described method, for example. A method of setting an interrupt threshold according to an embodiment of the present invention is not limited thereto.

Referring again to FIG. 7, an example of processing of deriving a luminance set value based on an illuminance value in the information processing apparatus 100 is described hereinafter. After setting the interrupt threshold in the step S202, the luminance control unit 110 releases the interrupt state of the illuminance sensor of the illuminance detection unit 102 (S204). In the configuration where the illuminance detection unit 102 does not enter the interrupt state, the luminance control unit 110 does not perform the processing in the step S204.

The luminance control unit 110 determines whether the interrupt signal transferred from the illuminance detection unit 102 is detected (S206). If it is not determined in the step S206 that the interrupt signal is detected, the luminance control unit 110 does not proceed to the next step until it is determined that the interrupt signal is detected.

On the other hand, if it is determined in the step S206 that the interrupt signal is detected, the luminance control unit 110 acquires an illuminance value from the illuminance detection unit 102 (S208). The luminance control unit 110 acquires an illuminance value by transmitting an acquisition request for an illuminance value to the illuminance detection unit 102, for example.

After acquiring the illuminance value in the step S208, the luminance control unit 110 derives a luminance set value (S210). The luminance control unit 110 may derive the luminance set value based on the set luminance level and the illuminance value by using the method of deriving a luminance set value described above, for example. Information of the currently set luminance level for deriving a luminance set value is stored in the recording medium 156 or the like, and the luminance control unit 110 derives the luminance set value by appropriately reading the information of the luminance level from the recording medium 156, for example.

After deriving the luminance set value in the step S210, the luminance control unit 110 outputs the derived luminance set value to the display control unit 112 or a light source control unit 114, which are described later (S212). As a result that the luminance control unit 110 transfers the luminance set value to the display control unit 112, the display control unit 112 can derive information of power consumption corresponding to luminance setting and present a user with the information of power consumption. Further, as a result that the luminance control unit 110 transfers the luminance set value to the light source control unit 114, the light source control unit 114 can control a light source to emit light with the luminance according to the luminance set value.

After outputting the luminance set value in the step S212, the luminance control unit 110 repeats processing from the step S202.

As a result that the luminance control unit 110 performs the processing shown in FIG. 7, for example, it is possible to derive the luminance set value each time the amount of change in illuminance value exceeds a predetermined threshold in the illuminance detection unit 102. Further, the luminance set value that is derived by the luminance control unit 110 is used for control of the luminance of a light source (which is described later). Therefore, the information processing apparatus 100 can adjust the luminance of the light source based on the detected brightness.

[Processing 2 of the Luminance Control Unit 110: Processing of Deriving a Luminance Set Value Based on a Change in Luminance Level]

Figure 9:
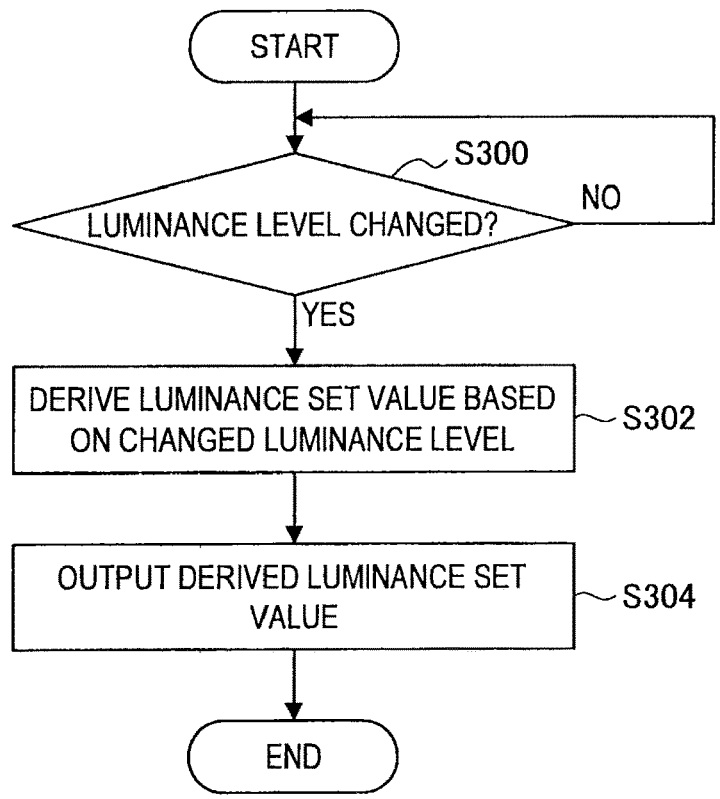
FIG. 9 is a flowchart showing a second example of processing of a luminance control unit in an information processing apparatus according to an embodiment of the present invention.

FIG. 9 is a flowchart showing a second example of processing of the luminance control unit 110 in the information processing apparatus 100 according to an embodiment of the present invention. FIG. 9 shows an example of processing of deriving a luminance set value based on a change in luminance level in the information processing apparatus 100.

The luminance control unit 110 determines whether the luminance level is changed (S300). The luminance control unit 110 may recognize a change in luminance level and a changed luminance level based on a switch signal according to operation input by a user using the operation unit 108, operation of a switch screen by a user using the operation unit 108 or the like, although not limited thereto. The operation input by a user may be pressing of a changeover button, selection using a rotating selector such as a jog dial or the like, for example, though not limited thereto. Further, the switch screen may be a screen where display is controlled by the display control unit 112, a screen which is incorporated into the OS or the like, for example, though not limited thereto.

If it is not determined in the step S300 that the luminance level is changed, the luminance control unit 110 does not proceed to the next step until it is determined that the luminance level is changed.

On the other hand, if it is determined in the step S300 that the luminance level is changed, the luminance control unit 110 derives the luminance set value based on the luminance level after change (S302). The luminance control unit 110 may derive the luminance set value based on the luminance level according to a switch signal (a changed luminance level) and the latest illuminance value by using the method of deriving a luminance set value described above, for example, although not limited thereto. For example, the luminance control unit 110 may store a parameter for change in luminance level and derive the luminance set value according to a change in luminance level based on the luminance level according to a switch signal (a changed luminance level) and the parameter. Alternatively, the luminance control unit 110 may derive the luminance set value by updating information of the luminance level stored in the recording medium 156 to the luminance level according to a switch signal and reading the updated information of the luminance level.

After deriving the luminance set value in the step S302, the luminance control unit 110 outputs the luminance set value in the same manner as the step S212 in FIG. 7 (S304).

As a result that the luminance control unit 110 performs the processing shown in FIG. 9, for example, it is possible to derive the luminance set value corresponding to a changed luminance level each time a luminance level changes. Therefore, the information processing apparatus 100 can adjust the luminance of a light source based on a change in luminance level.

[Application Processing of Derivation of a Luminance Set Value]

The luminance control unit 110 can derive the luminance set value corresponding to a changed luminance level by performing the processing shown in FIG. 9, for example. In the case where a luminance value is changed largely, when the luminance control unit 110 switches the luminance value before change to the luminance value after change, there is a possibility that a change in luminance on the display screen is perceived as being too extreme by use's eyes as a result of luminance control based on the derived luminance set value. In light of this, the information processing apparatus 100 changes the luminance value to a target luminance value gradually in multiple steps, for example, in order to allow a change in luminance when the luminance value changes significantly to be a more natural change (e.g. a change that causes a user to feel less uncomfortable).

Figure 10:
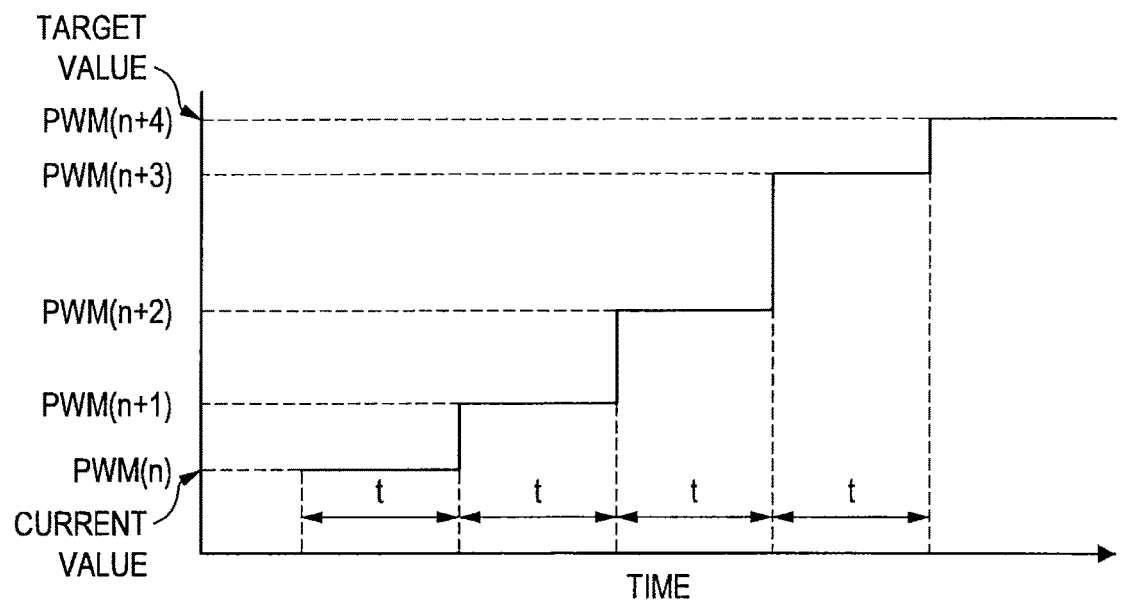
FIG. 10 is an explanatory view to describe an example of an application of a method of deriving a luminance set value based on a change in luminance level in a luminance control unit of an information processing apparatus according to an embodiment of the present invention.

FIG. 10 is an explanatory view to describe an example of an application of a method of deriving a luminance set value based on a change in luminance value in the luminance control unit 110 of the information processing apparatus 100 according to an embodiment of the present invention. FIG. 10 shows an example of deriving the luminance set value of the luminance control unit 110 in the case where the luminance value is changed to be higher.

If the luminance value is changed to be higher or if the illuminance varies to be higher, the luminance control unit 110 changes the luminance set value in a step-by-step manner to a luminance set value corresponding to a target luminance level (which is referred to hereinafter as "target value"). Specifically, the luminance control unit 110 increases the luminance level step by step each time a prescribed period t elapses by using the following Expression 11, for example. In Expression 11, "PWM Changing Rate" indicates a rate of the upper limit of the amount of change in luminance with respect to the luminance value. The upper limit of the amount of change in luminance is set as a rate with respect to the luminance value in order to allow a change in luminance when changing the luminance to a target value to be perceived uniformly. As supplementary explanation, if PWM is incremented one by one, a change is perceived to be faster in a darker region, and a change is perceived to be slower in a brighter region, and therefore the luminance control unit 110 performs the above processing, for example.

$$PWM(n+1)=PWM(n)\times(100+PWM \text{ Changing Rate}) \quad \text{Expression 11:}$$

where PWM(n+1)=target value when PWM(n+1)>target value.

As a result that the luminance control unit 110 increases the luminance set value that is derived based on the above Expression 11 to a target value in a step-by-step manner, for example, the information processing apparatus 100 can change the luminance of a light source more smoothly. The information processing apparatus 100 can thereby prevent an abrupt change in luminance.

Although the case where the luminance value is changed to be higher or the illuminance varies to be higher is described above by way of illustration, the luminance control unit 110 can reduce the luminance set value to a target value in a step-by-step manner when the luminance value is changed to be lower or the illuminance varies to be lower. Specifically, the luminance control unit 110 reduces the derived luminance set value to a target value step by step by using the following Expression 12, for example.

$$PWM(n+1)=PWM(n)\times(100-PWM \text{ Changing Rate}) \quad \text{Expression 12:}$$

where PWM(n+1)=target value when PWM(n+1)<target value.

The luminance control unit 110 can change the luminance of a light source more smoothly by using the above Expression 11 and Expression 12, for example. The information processing apparatus 100 can thereby prevent an abrupt change in luminance by the application processing of derivation of a luminance set value described above.

By performing the above-described processing, for example, the luminance control unit 110 can derive the luminance set value based on the illuminance value that is output from the illuminance detection unit 102 and the switch signal according to operation input or the like in the operation unit 108, for example. The information processing apparatus 100 can thereby adjust the luminance of a light source based on the detected brightness (illuminance value) by including the luminance control unit 110.

The display control unit 112 is composed of an MPU, a chipset, a graphic chip that outputs an image signal to be displayed on a display screen or the like, for example and has a role to perform the above processing [2] (processing of presenting information about power consumption). Specifically, the display control unit 112 derives information about power consumption based on the luminance set value that is derived by the luminance control unit 110 and presents information about power consumption of a light source 116.

<Example of Processing of the Display Control Unit 112>

Figure 11:
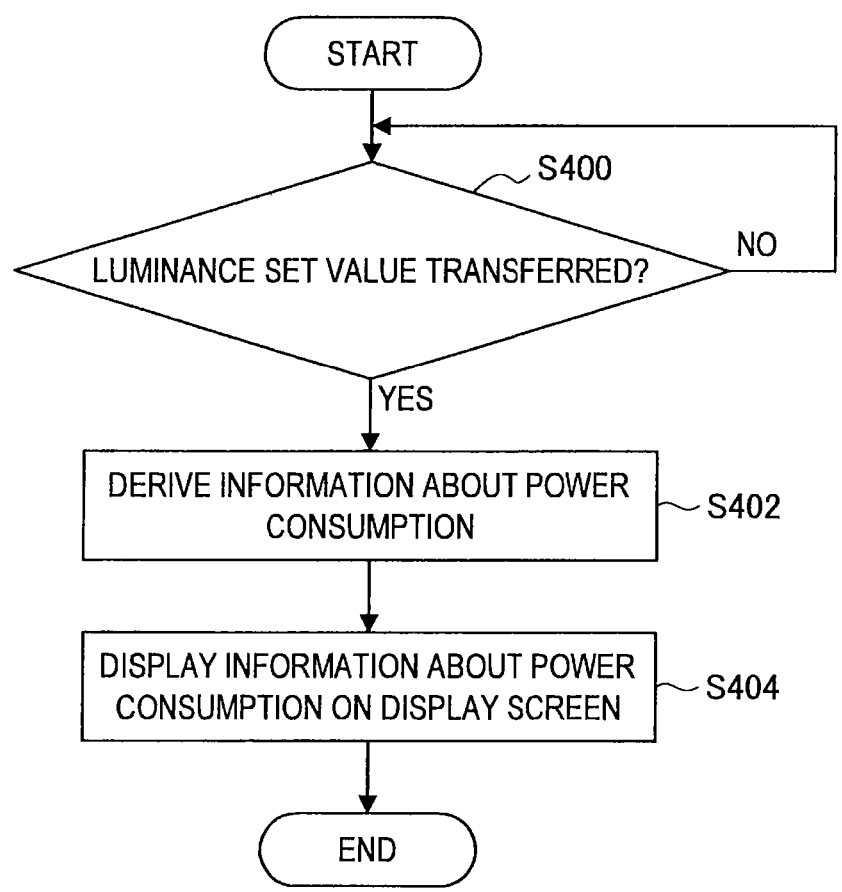
FIG. 11 is a flowchart showing an example of processing of a display control unit included in an information processing apparatus according to an embodiment of the present invention.

FIG. 11 is a flowchart showing an example of processing of the display control unit 112 included in the information processing apparatus 100 according to an embodiment of the present invention.

The display control unit 112 determines whether a luminance set value is transferred (S400). If it is not determined in the step S400 that a luminance set value is transferred, the display control unit 112 does not proceed to the next step until it is determined that a luminance set value is transferred.

If it is determined in the step S400 that a luminance set value is transferred, the display control unit 112 derives information about power consumption of a light source 116 based on the luminance set value. The information about power consumption that is derived by the display control unit 112 may be a value of power consumption of the light source 116, a rate in the maximum power consumption of the light source 116 or the like, though not limited thereto The display control unit 112 can uniquely derive the information about power consumption based on the luminance set value by using the above-described deriving methods (I) to (III), for example.

After deriving the information about power consumption in the step S402, the display control unit 112 displays the information about power consumption on a display screen (S404). A display example of information about power consumption to be displayed on a display screen by the display control unit 112 is described hereinafter with reference to FIGS. 12 and 13 where appropriate.

<Display Example of Information about Power Consumption>

(1) First Display Example

Figure 12:
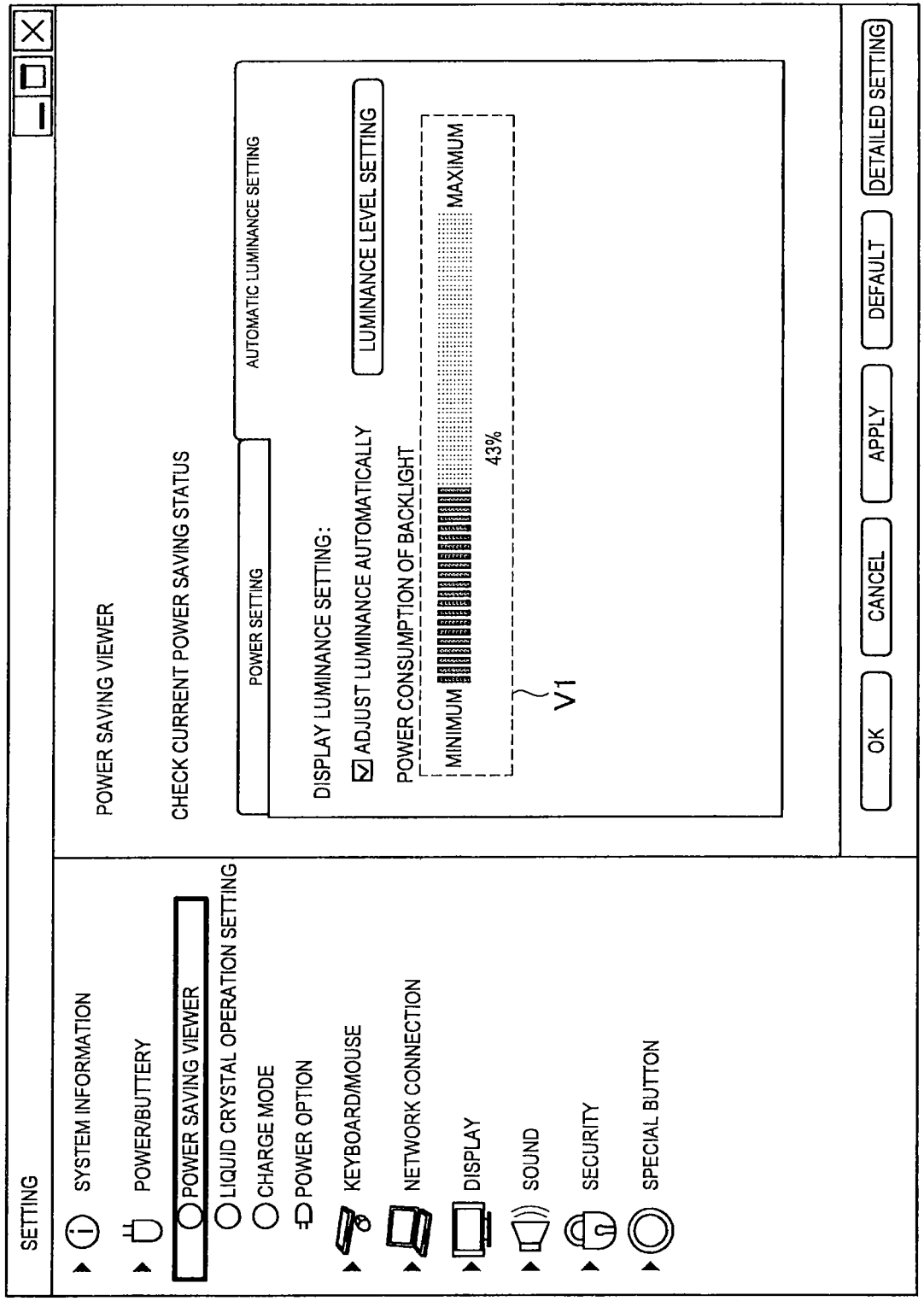
FIG. 12 is an explanatory view showing a first display example of information about power consumption to be displayed on a display screen by a display control unit included in an information processing apparatus according to an embodiment of the present invention.

FIG. 12 is an explanatory view showing a first display example of information about power consumption to be displayed on a display screen by the display control unit 112 that is included in the information processing apparatus 100 according to an embodiment of the present invention. FIG. 12 shows an example of a display screen in the case where the information processing apparatus 100 is applied to a notebook PC that includes an LCD.

Referring to V1 of FIG. 12, a power consumption rate (information about power consumption) in a backlight (light source) is represented by a meter that deflects left or right and a numerical value in FIG. 12. As shown in V1 of FIG. 12, the information about power consumption is visually presented, so that a user can recognize how much power is consumed in the light source 116. The information processing apparatus 100 can thereby assist a user to set the luminance level according to a purpose.

(2) Second Display Example

Figure 13:
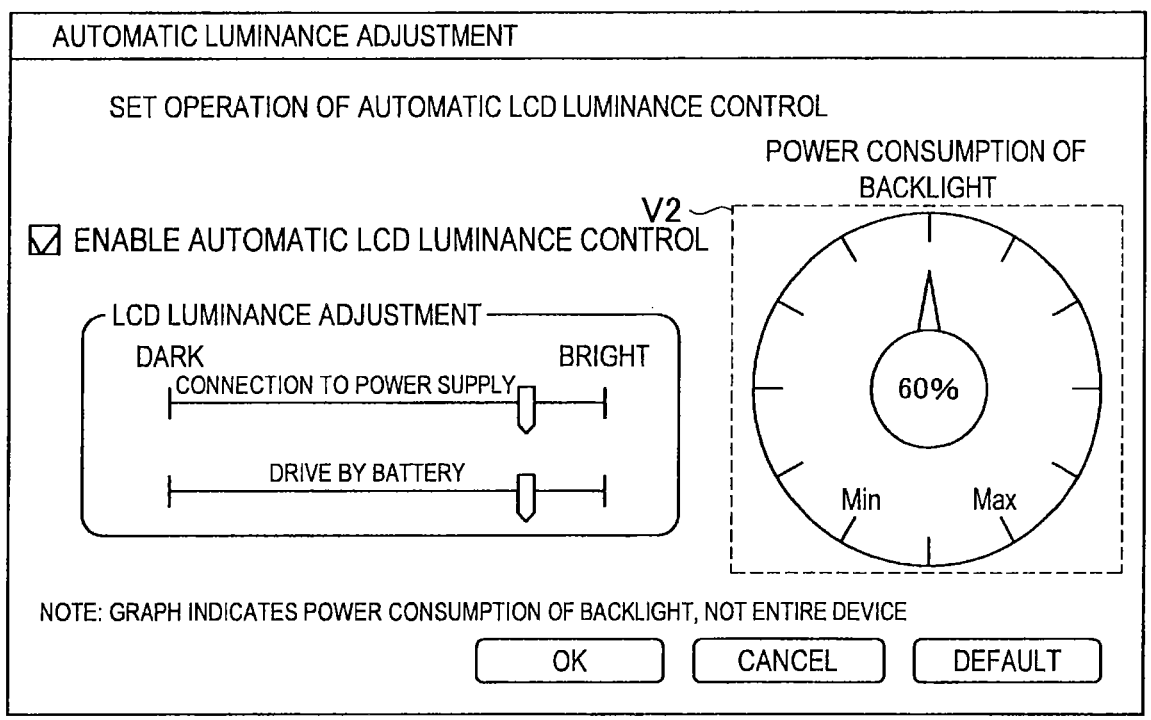
FIG. 13 is an explanatory view showing a second display example of information about power consumption to be displayed on a display screen by a display control unit included in an information processing apparatus according to an embodiment of the present invention.

FIG. 13 is an explanatory view showing a second display example of information about power consumption to be displayed on a display screen by the display control unit 112 that is included in the information processing apparatus 100 according to an embodiment of the present invention.

As shown in V2 of FIG. 13, the display control unit 112 may represent the power consumption rate by a circular meter and a numerical value, not limited to representing the power consumption rate by the meter deflecting left or right and the numerical value as shown in V1 of FIG. 12. As shown in V2 of FIG. 12, the information about power consumption is visually presented, so that a user can recognize how much power is consumed in the light source 116.

The display control unit 112 displays the screen as shown in FIGS. 12 and 13, for example, on a display screen, thereby visually presenting the information about power consumption. By including the display control unit 112, the information processing apparatus 100 can present a user with the information about power consumption of a light source and assist a user to set the luminance level according to a purpose.

A display example of information about power consumption according to an embodiment of the present invention is not limited to the examples shown in FIGS. 12 and 13. For example, the display control unit 112 may present a user with a value of power consumption in the same layout as in FIGS. 12 and 13. Further, the display control unit 112 may present a user with information about power consumption by using a meter that deflects up or down, or may display both a value of power consumption and a power consumption rate, for example.

As a result that the display control unit 112 performs the processing shown in FIG. 11, for example, it is possible to present a user with information about power consumption of the light source 116. Although the case where the display control unit 112 visually presents information about power consumption is described above, the present invention is not limited thereto, and the display control unit 112 may auditorily present information about power consumption. As a method of auditorily presenting information about power consumption, the display control unit 112 may output information about power consumption from an audio output device composed of a DSP (Digital Signal Processor), an amplifier, a speaker or the like, for example.

<Other Display Examples>

The case where the display control unit 112 displays information about power consumption on a display screen is described in the foregoing. However, the information to be displayed on a display screen by the display control unit 112 is not limited to the information about power consumption. As another display example by the display control unit 112, an example of presenting a user with a luminance set value transferred from the luminance control unit 110 and a set luminance level is described hereinbelow.

Figure 14:
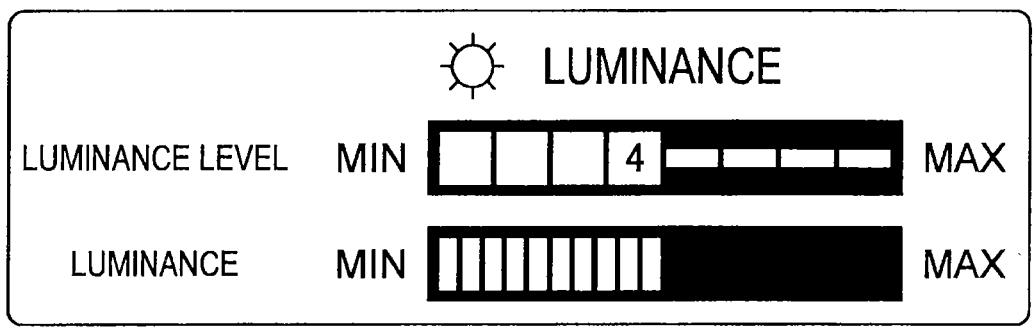
FIG. 14 is an explanatory view showing another display example to be displayed on a display screen by a display control unit included in an information processing apparatus according to an embodiment of the present invention.

FIG. 14 is an explanatory view showing another display example to be displayed on a display screen by the display control unit 112 that is included in the information processing apparatus 100 according to an embodiment of the present invention. FIG. 14 shows an example in which the display control unit 112 displays a luminance set value and a set luminance level.

As shown in FIG. 14, the currently set luminance level and the current luminance of the light source are displayed on the display screen, so that a user can recognize the currently set luminance level and the current luminance of the light source. Although the display control unit 112 may represent the luminance of the light source by an actual value of the luminance set value, the present invention is not limited thereto. For example, the display control unit 112 may convert the value of the luminance set value by using the logarithm or the like.

Figure 15:
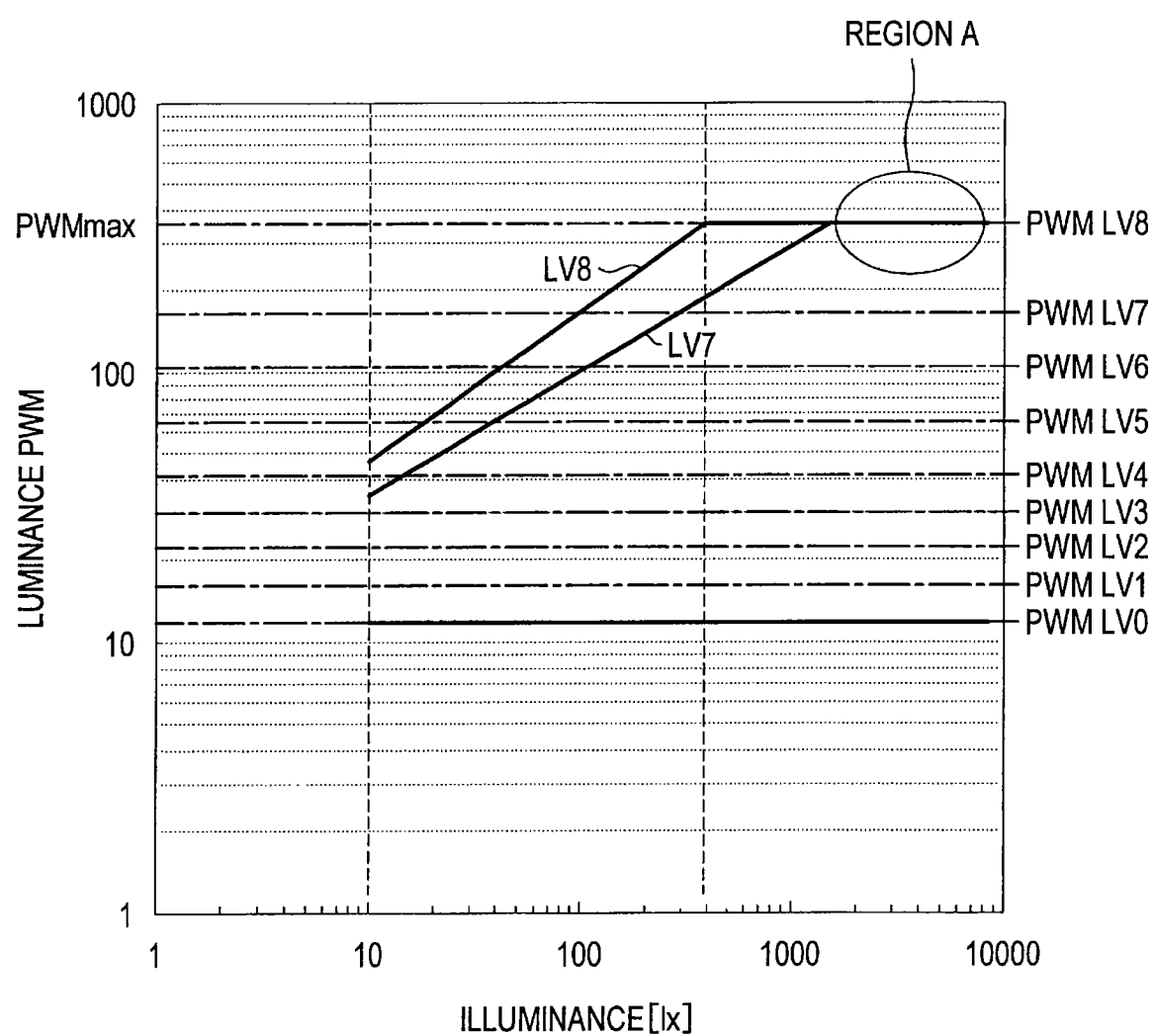
FIG. 15 is an explanatory view to describe a case where no change occurs in luminance of a light source when a change is made to a luminance level.

In the case where the currently set luminance level and the current luminance of the light source are displayed on the display screen as shown in FIG. 14, a case can occur where the luminance of the light source 116 does not change even if a user increases the luminance level. FIG. 15 is an explanatory view to describe a case where no change occurs in the luminance of the light source 116 when a change is made to the luminance level.

In the case where the upper limit (maximum value) PWMmax of the luminance set value is reached at difference luminance levels as shown in the region A of FIG. 15, the luminance of the light source 116 stays the upper limit PWMmax and does not change even if a user increases the luminance level. In such a case, user's operation results in nothing. Thus, the display control unit 112 presents a user with a notification that luminance does not change even if a luminance level is changed, thereby preventing the occurrence of useless operation by a user as described above.

Figure 16:
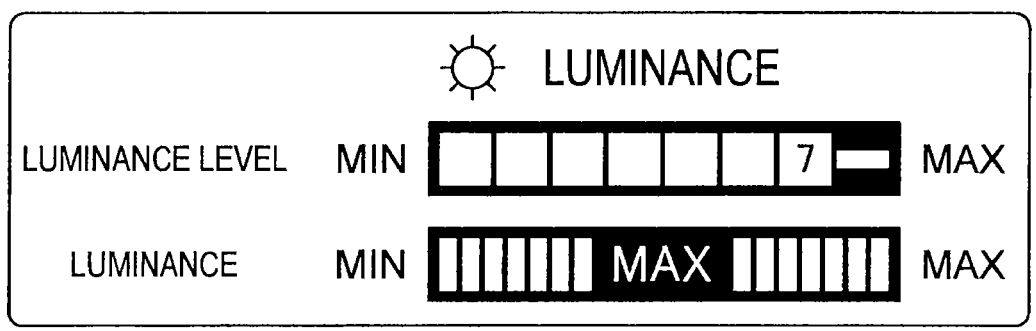
FIG. 16 is an explanatory view showing another display example to be displayed on a display screen by a display control unit included in an information processing apparatus according to an embodiment of the present invention.
Figure 17:
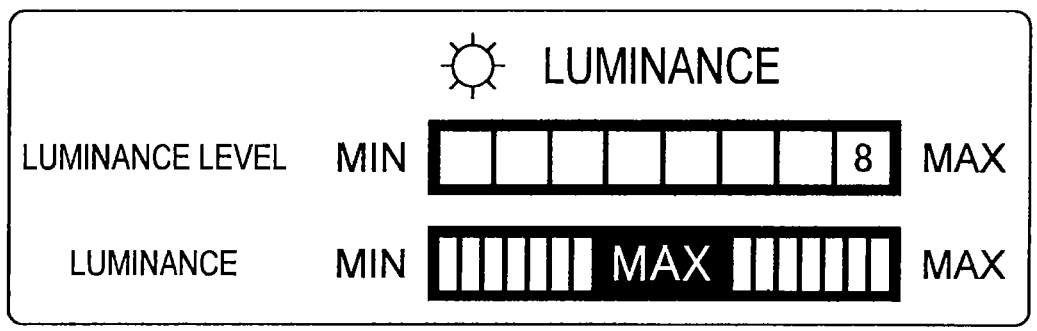
FIG. 17 is an explanatory view showing another display example to be displayed on a display screen by a display control unit included in an information processing apparatus according to an embodiment of the present invention.

FIGS. 16 and 17 are explanatory views showing other display examples to be displayed on a display screen by the display control unit 112 that is included in the information processing apparatus 100 according to an embodiment of the present invention. FIGS. 16 and 17 show the screen in the similar layout to the display screen shown in FIG. 14.

The display control unit 112 clearly indicates that the current luminance of the light source 116 is a maximum value as shown in FIG. 16, for example. By clearly indicating that the current luminance of the light source 116 is a maximum value as shown in FIG. 16, for example, it is possible to allow a user to recognize that the luminance of the light source 116 is already at maximum. The information processing apparatus 100 can thereby prevent the occurrence of useless operation by a user as described above. A display example for preventing the occurrence of useless operation by a user as described above is not limited to FIG. 16. For example, the display control unit 112 may display a message indicating that the luminance does not increase any more even if the luminance level is set higher. Because the luminance does not change when a user performs operation of increasing the luminance level in the state shown in FIG. 16, display indicating the luminance also does not change as shown in FIG. 17.

As a result that the display control unit 112 displays the currently set luminance level and the current luminance of the light source on the display screen as shown in FIGS. 14, 16 and 17, it is possible for a user to recognize the currently set luminance level and the current luminance of the light source.

Further, the display control unit 112 may present a user with both the display screen shown in FIG. 14, 16 or 17 and the display screen presenting information about power consumption shown in FIG. 12 or 13, for example. In such a case, a user can adjust the luminance level by referring to information about the current luminance level and information about the power consumption of the light source 116, and therefore the display control unit 112 can provide a higher effect of assisting a user to set the luminance level according to a purpose.

By including the luminance control unit 110 and the display control unit 112, the control unit 104 can perform the above processing [1] (processing of adjusting luminance) and the above processing [2] (processing of presenting information about power consumption). Although the control unit 104 may implement the processing [1] and the processing [2] described above by software (e.g. a general-purpose MPU or the like executes an application (program) for the processing [1] and [2]), the present invention is not limited thereto. For example, the control unit 104 may include a dedicated processing circuit (hardware) that performs the processing [1] and the processing [2] described above and implement the processing [1] and [2] by using the processing circuit.

The display unit 106 is a display means that is included in the information processing apparatus 100. The display unit 106 includes the light source control unit 114, the light source 116, and a display panel 118. Although not shown in FIG. 4, the display unit 106 further includes various drivers (scan driver, data driver) for displaying an image represented by an image signal indicating a display screen transferred from the display control unit 112 on the display panel 118, for example.

The light source control unit 114 supplies a light emission signal that causes the light source 116 to emit light and regulates the luminance of the light source 116 to the light source 116 based on the luminance set value that is transferred from the luminance control unit 110. The light source control unit 114 supplies a driving current based on the luminance set value as the light emission signal to the light source 116, so that the light source 116 can emit light at the luminance corresponding to the luminance set value.

The light source 116 emits light according to the light emission signal that is supplied from the light source control unit 114. The light source 116 may be composed of an LED (Light Emitting Diode) and a fluorescent material, for example, although not limited thereto.

The display panel 118 contains a plurality of pixels arranged in a matrix (in an array), for example, and has a role as a display screen on which an image (still image/moving image) is displayed. For example, the panel that displays an image at an SD (Standard Definition) resolution contains at least 640×480=307200 (data lines×scan lines) pixels, and if the pixels are composed of R, G and B sub-pixels for color display, the panel contains 640×480×3=921600 (data lines× scan lines×the number of sub-pixels) sub-pixels. Likewise, the panel that displays a video at an HD (High Definition) resolution contains 1920×1080 pixels, and contains 1920× 1080×3 sub-pixels for color display.

Further, the display panel 118 includes a pixel electrode (not shown) and a pixel circuit (not shown) for driving the pixel electrode in each pixel. The display panel 118 also includes a counter electrode (so-called common electrode; not shown) on a surface placed opposite to each pixel electrode with a given distance therebetween, for example, and a liquid crystal layer is interposed between the surface where the pixels are formed and the surface where the counter electrodes are placed. The pixel circuit includes a switching element that turns on or off according to a scan signal that is transferred from the scan line and applies a data signal corresponding to an image signal that is transferred from the data line to the pixel electrode, for example. As a result that each pixel circuit selectively applies the data signal to the pixel electrode, the orientation of liquid crystals between the pixel electrode and the counter electrode changes by an electric field according to the data signal that is formed between the pixel electrode to which the data signal is applied and the counter electrode. By such an operation, a so-called liquid crystal shutter is implemented in the display panel 118. The switching element may be a TFT (Thin Film Transistor), for example, although not limited thereto.

By the above configuration, the display unit 106 can display information about power consumption on the display screen as shown in FIG. 12 or 13, for example, and display other information on the display screen as shown in FIG. 14, for example.

Although a case where the information processing apparatus 100 includes an LCD (Liquid Crystal Display) as the display unit 106 is described in the foregoing, the configuration of the display unit 106 is not limited thereto. Further, the information processing apparatus 100 may control the luminance of a light source included in a display device as an external apparatus and display various kinds of information such as information about power consumption on a display screen of the display device, rather than including the display unit 106.

The operation unit 108 is an operating means that enables operation by a user that is included in the information processing apparatus 100. With the operation unit 108 included, the information processing apparatus 100 can perform processing desired by a user, such as turn on/off of the luminance control according to an embodiment of the present invention. Thus, the operation unit 108 may have a role as a level setting unit for setting a luminance level. The operation unit 108 may be an operation input device such as a keyboard or a mouse, a rotating selector such as a button, a direction key or a jog dial, a combination of those or the like, for example, though not limited thereto.

By the configuration shown in FIG. 4, for example, the information processing apparatus 100 can perform the above processing [1] (processing of adjusting luminance) and the above processing [2] (processing of presenting information about power consumption). Therefore, the information processing apparatus 100 can adjust the luminance of a light source based on detected brightness and present a user with information about the power consumption of the light source, thereby assisting user's luminance adjustment operation.

As described in the foregoing, the information processing apparatus 100 according to an embodiment of the present invention includes the illuminance detection unit 102 and the control unit 104 and performs the processing [1] (processing of adjusting luminance) and the processing [2] (processing of presenting information about power consumption) described above. The information processing apparatus 100 derives a luminance set value for controlling a light emission signal that regulates the luminance of a light source based on an illuminance value according to detected brightness and a set luminance level. Thus, the information processing apparatus 100 can adjust the luminance of the light source based on the detected brightness. Further, the information processing apparatus 100 derives information about power consumption based on the derived luminance set value, thereby presenting a user with the information about power consumption of the light source. Given the information about the power consumption of the light source, a user can recognize how much power is consumed in the light source, a power saving effect by the set luminance level or the like, and it is thereby possible to set the luminance level more easily according to a purpose. Thus, a user can perform an operation for preventing the occurrence of the above-described cases (a) and (b) based on the presented information about the power consumption of the light source. Accordingly, by presenting the information about the power consumption of the light source, the information processing apparatus 100 can assist user's luminance adjustment operation such as setting of a luminance level by a user (second luminance adjustment method). The information processing apparatus 100 can thereby adjust the luminance of the light source based on detected brightness and present a user with the information about the power consumption of the light source, thereby assisting user's luminance adjustment operation.

Further, because the information processing apparatus 100 derives the information about the power consumption based on the luminance set value, it is possible to derive the information about the power consumption without including a dedicated detection circuit as shown in FIG. 3, for example. The information processing apparatus 100 can thereby prevent an increase in hardware costs for implementing the above processing [1] (processing of adjusting luminance).

Although the information processing apparatus 100 is described in the foregoing as an embodiment of the present invention, the embodiment of the present invention is not limited thereto. The embodiment of the present invention may be applied to various kinds of equipment including computers such as all-in-one PC and notebook PC including a PC and a display device, portable communication apparatus such as cellular phones and PHS (Personal Handyphone System), video/music playback apparatus such as WALK MAN (registered trademark), portable game machines such as Playstation Portable (registered trademark), non-self-luminous display apparatus such as LCD and so on.

(Program Related to the Information Processing Apparatus According to an Embodiment of the Present Invention)

With use of a program that causes a computer to function as the information processing apparatus 100 according to an embodiment of the present invention, it is possible to adjust the luminance of a light source based on detected brightness and present a user with information about the power consumption of the light source, thereby assisting user's luminance adjustment operation.

It should be understood by those skilled in the art that various modifications, combinations, sub-combinations and alterations may occur depending on design requirements and other factors insofar as they are within the scope of the appended claims or the equivalents thereof.

For example, although the case of providing a program (computer program) that causes a computer to function as the information processing apparatus 100 according to an embodiment of the present invention is described above, the embodiment of the present invention may further provide a storage medium that stores each of the above programs.

The above-described configuration shows an example of an embodiment of the present invention, which is intended for inclusion within the scope of the present invention.

The present application contains subject matter related to that disclosed in Japanese Priority Patent Application JP 2008-231273 filed in the Japan Patent Office on Sep. 9, 2008, the entire content of which is hereby incorporated by reference.

What is claimed is:

1. An electronic device comprising:
   a battery configured to supply power; and
   circuitry configured to
   detect brightness and output an illuminance value corresponding to the detected brightness;
   derive a luminance set value for controlling a light signal setting luminance of a light source based on the illuminance value corresponding to the detected brightness and one luminance level set by a user among a plurality of luminance levels, wherein the luminance set value is derived by deriving a slope specific to the one luminance level, multiplying the slope by the illuminance value, and adding a lower limit of the luminance set value specific to the one luminance level, wherein the slope is computed based on a difference between the lower limit of the luminance set value and a luminance set value determined in advance to correspond to the one luminance level and a difference between the illuminance value and a minimum illuminance value corresponding to the lower limit of the luminance set value;
   derive power consumption consumed from the battery in the light source based on the luminance set value; and
   control a display to display information relating to the power consumption, the luminance set value and the one luminance level set among the plurality of luminance levels.

2. The electronic device of claim 1, wherein the circuitry is configured to:
   set one luminance level among a plurality of luminance levels regulating a lower limit and an upper limit of the luminance set value; and
   derive the luminance set value based on the set luminance level and the illuminance value.

3. The electronic device of claim 2, wherein
   if the set luminance level is changed, the circuitry is configured to derive a luminance set value corresponding to a luminance level after change from the luminance set value corresponding to the luminance level before change in a step-by-step manner.

4. The electronic device of claim 1,
   wherein the circuitry is further configured to transfer a light emission signal corresponding to the luminance set value to the light source based on the derived luminance set value.

5. The electronic device claim 1, wherein the circuitry is configured to:
   output a notification when an amount of change in the detected brightness exceeds a predetermined threshold; and
   output the illuminance value based on the notification.

6. The electronic device of claim 1, wherein:
   the light source has a maximum luminance value; and
   the circuitry is configured such that, when the luminance set value reaches the maximum luminance value, the circuitry controls the display to display an indication that the maximum luminance value has been reached.

7. The electronic device of claim 1, wherein the displayed information relating to the power consumption comprises the power consumption.

8. A method performed by an electronic device, the method comprising:
   receiving power from a battery;
   detecting brightness and output an illuminance value corresponding to the detected brightness;
   deriving a luminance set value for controlling a light signal setting luminance of a light source based on the illuminance value corresponding to the detected brightness and one luminance level set by a user among a plurality of luminance levels, wherein the luminance set value is derived by deriving a slope specific to the one luminance level, multiplying the slope by the illuminance value, and adding a lower limit of the luminance set value specific to the one luminance level, wherein the slope is computed based on a difference between the lower limit of the luminance set value and a luminance set value determined in advance to correspond to the one luminance level and a difference between the illuminance value and a minimum illuminance value corresponding to the lower limit of the luminance set value;
   deriving power consumption consumed from the battery in the light source based on the luminance set value; and
   controlling a display to display information relating to the power consumption, the luminance set value and the one luminance level set among the plurality of luminance levels.

9. A non-transitory computer-readable medium including computer-program instructions, which when executed by an electronic device comprising a battery, cause the electronic device to:
   detect brightness and output an illuminance value corresponding to the detected brightness;
   derive a luminance set value for controlling a light signal setting luminance of a light source based on the illuminance value corresponding to the detected brightness and one luminance level set by a user among a plurality of luminance levels, wherein the luminance set value is derived by deriving a slope specific to the one luminance level, multiplying the slope by the illuminance value, and adding a lower limit of the luminance set value specific to the one luminance level, wherein the slope is computed based on a difference between the lower limit of the luminance set value and a luminance set value determined in advance to correspond to the one luminance level and a difference between the illuminance value and a minimum illuminance value corresponding to the lower limit of the luminance set value;
   derive power consumption consumed from the battery in the light source based on the luminance set value; and control a display to display information relating to the power consumption, the luminance set value and the one luminance level set among the plurality of luminance levels.

* * * * *